United States Patent [19]
Bahn

[11] Patent Number: 5,355,069
[45] Date of Patent: Oct. 11, 1994

[54] RELUCTANCE TYPE MOTOR
[75] Inventor: Itsuki Bahn, Tokyo, Japan
[73] Assignee: Kabushikigaisha Sekogiken, Tokyo, Japan
[21] Appl. No.: 910,021
[22] PCT Filed: Nov. 15, 1991
[86] PCT No.: PCT/JP91/01565
  § 371 Date: Jul. 14, 1992
  § 102(e) Date: Jul. 14, 1992
[87] PCT Pub. No.: WO92/09139
  PCT Pub. Date: May 29, 1992
[30] Foreign Application Priority Data
  Nov. 15, 1990 [JP] Japan .................. 2-307150
[51] Int. Cl.[5] .................. H02P 8/00
[52] U.S. Cl. .................. 318/701; 318/696; 318/685
[58] Field of Search .................. 318/701–820, 318/138, 139, 254, 696; 310/166, 68 B, 254, 257, 263

[56] References Cited
U.S. PATENT DOCUMENTS

| | | | |
|---|---|---|---|
| 4,584,506 | 4/1986 | Kaszmann | 318/254 |
| 5,097,191 | 3/1992 | Bahn | 318/701 |
| 5,111,095 | 5/1992 | Hendershot | 310/168 |
| 5,138,244 | 8/1992 | Bahn et al. | 318/701 |
| 5,194,795 | 3/1993 | Bahn et al. | 318/685 |
| 5,231,342 | 7/1993 | Bahn | 318/696 |

FOREIGN PATENT DOCUMENTS
2-106192 4/1990 Japan .

OTHER PUBLICATIONS
"Steady-State Analysis of the Variable-Speed Switched-Reluctance Motor Drive," P. N. Materu et al., IEEE Transactions on Industrial Electronics, vol. 36, No. 4, Nov. 1989, New York, pp. 523–529.

Primary Examiner—Paul Ip
Attorney, Agent, or Firm—Staas & Halsey

[57] ABSTRACT

A reluctance type motor capable of rotating at a high speed with a large output torque includes transistors (20a~20f) connected to both ends of respective phase exciting coils (39a~39c), a current supply control circuit for successively activating the exciting coils in response to position detecting signals representing the rotational positions of a rotor, and diodes (21a~21f) connecting the exciting coils and capacitors (47a~47c). When a current supply to the exciting coil is stopped, one of the capacitors is promptly charged with the magnetic energy stored in the exciting coil to rapidly extinguish the magnetic energy and also an exciting current supplied to a subsequently activated exciting coil is rapidly built up by use of a charged voltage in the capacitor. The position detecting element is fixed at a required position on an armature, so that an advanced-phase current supply can be made in such a manner that the exciting current is supplied to the exciting coil before salient-poles begin to enter magnetic poles, and is continued during a predetermined large electric angle.

16 Claims, 21 Drawing Sheets

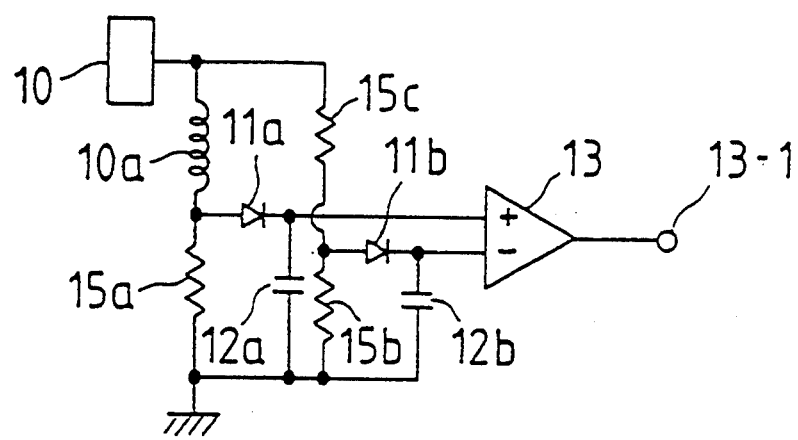
FIG. 9
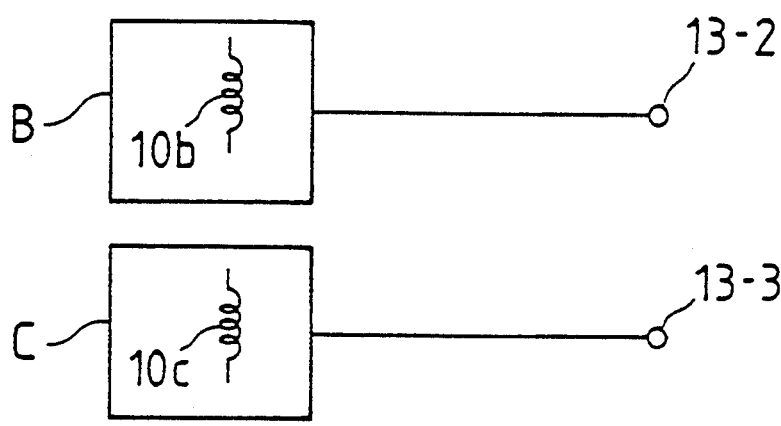
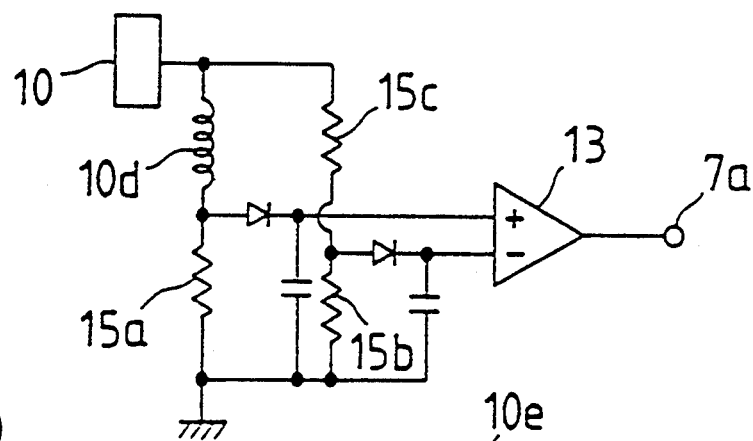
FIG. 20
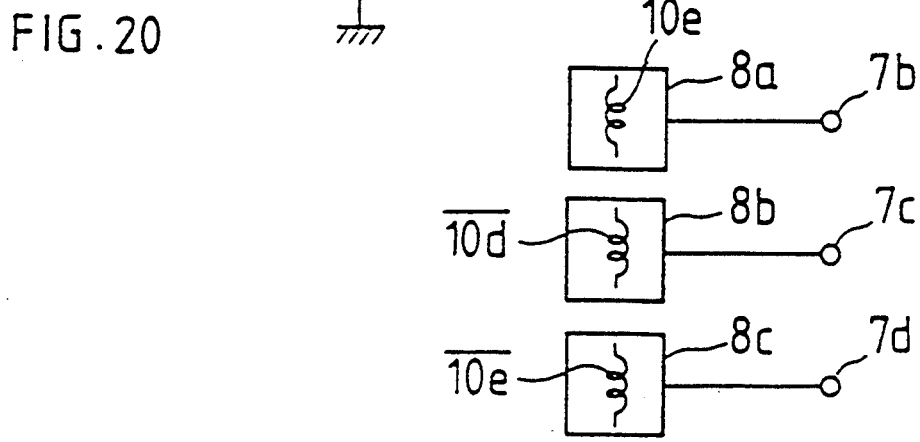

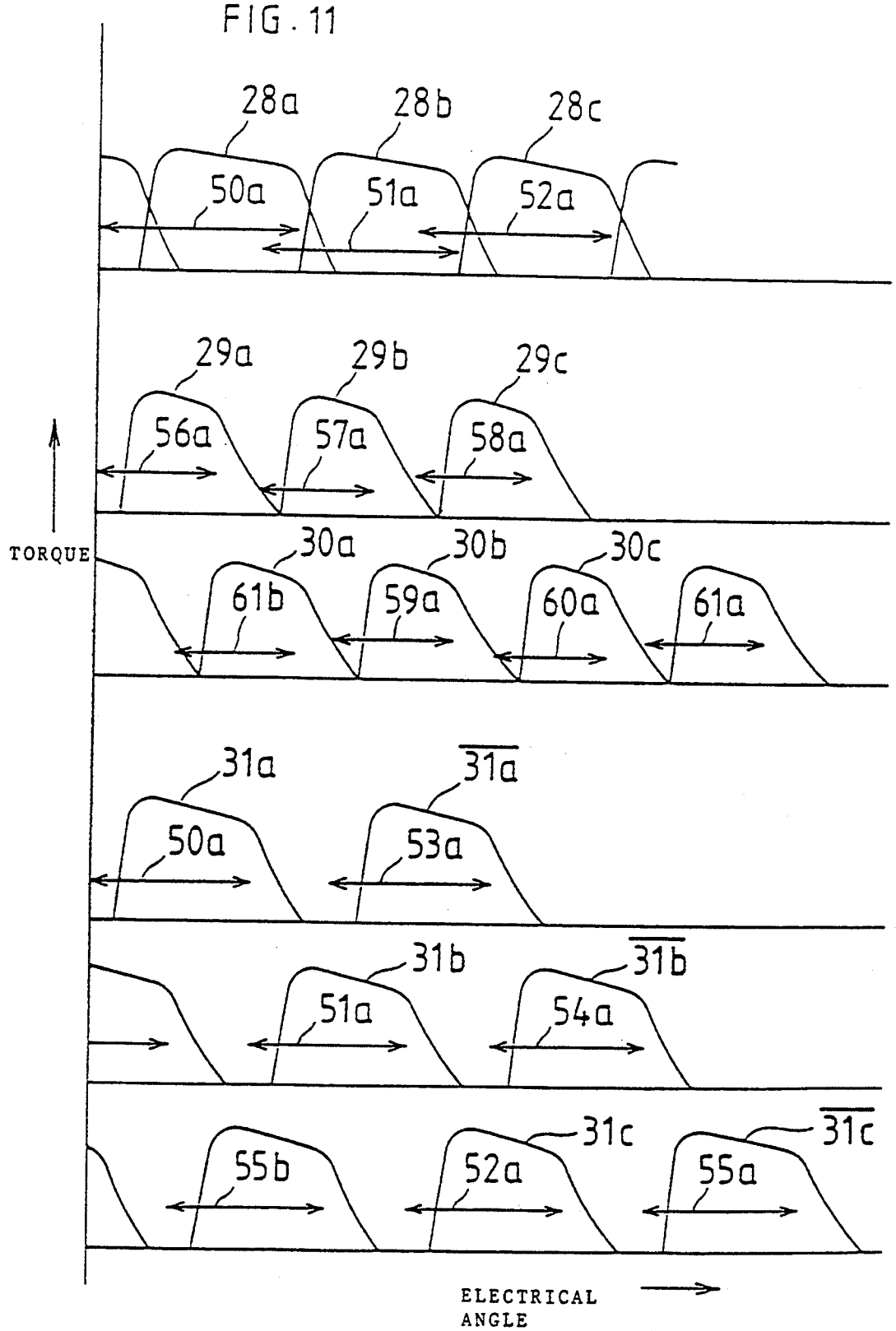

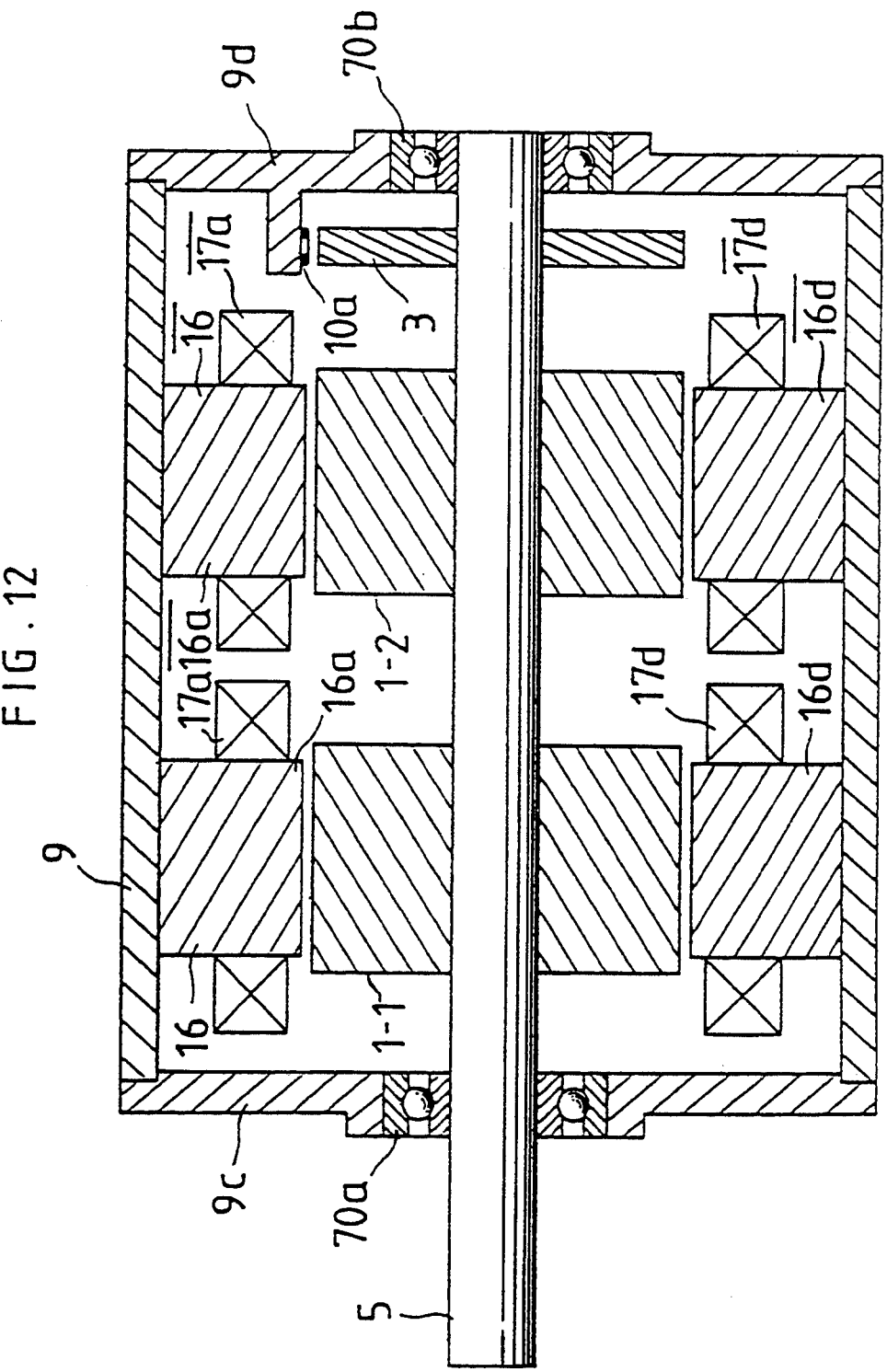

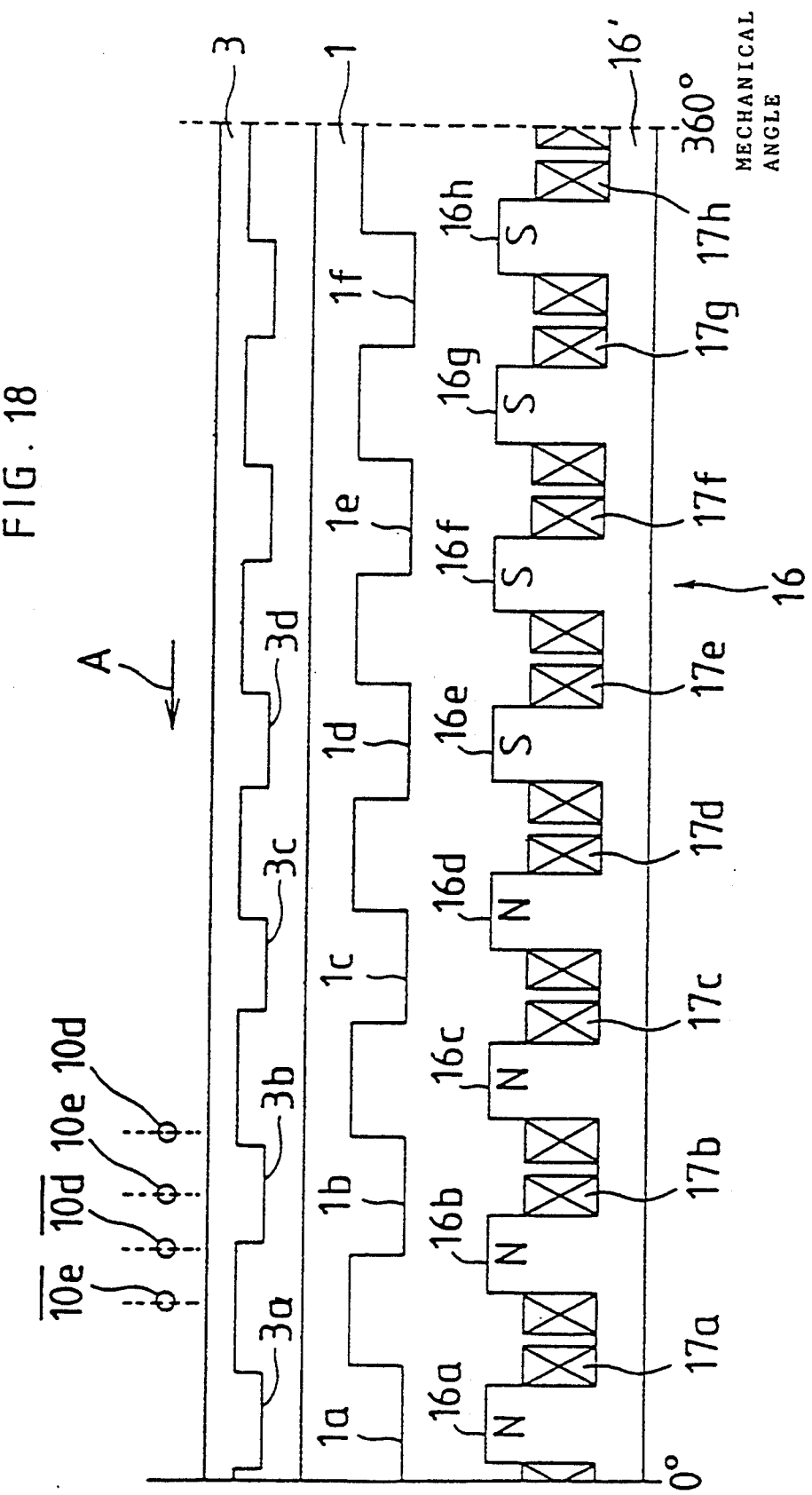

RELUCTANCE TYPE MOTOR

TECHNICAL FIELD

The present invention relates to a reluctance type motor, and more particularly to a reluctance type motor capable of being used a driving source for various industrial apparatuses instead of conventional brushless motors or inverter type induction motors.

BACKGROUND ART

A known reluctance type motor comprises a stator having a plurality of magnetic poles and a rotatably supported rotor having a plurality of salient-poles. A magnetic attraction force is generated between the stator magnetic poles being successively excited and their corresponding rotor salient-poles so as to rotate the rotor.

The reluctance motor is advantageous in that it generates a large output torque and requires no magnetic rotor. On the other hand, a conventional reluctance type motor has a disadvantage such that its application field is unexpectedly limited due to the difficulty of a high-speed operation.

That is, an exciting coil of the reluctance type motor has a large inductance, and thus the magnetic energy stored in the exciting coil becomes very large. Accordingly, it requires a significant time for storing or discharging the magnetic energy. In other words, a building-up and a trailing-edge of the exciting current are undesirably delayed.

Furthermore, the magnetic energy storage and discharge in a magnetic pole are so frequently repeated during one complete revolution that a torque reduction occurs together with a counter torque. Moreover, in a last stage of a current supply period, an exciting current not contributing to the generation of an output torque will increase to cause a large joule loss. As a result, an operational efficiency of the motor is lowered and, therefore, its rotational speed is remarkably reduced.

If so-called advanced-phase current supply method, in which an exciting current is supplied to the exciting coil well before the salient-poles enter the magnetic poles, is applied to drive a reluctance type motor at a high speed, a disadvantage is usually recognized such that the motor output torque will not be generated and a copper loss will take place in a section, for example, of a 30-degree advanced phase angle, or an output torque generating section becomes fairly short. More specifically, the motor output torque is reduced and a torque ripple will be generated.

If the number of salient-poles and the number of magnetic poles are increased in order to increase the output torque of the motor, the time periods required for building up and trailing off the exciting current will increase due to the stored magnetic energy, causing a marked fall of rotational speed; the construction of the motor becomes complicated; and its size inevitably increases. Especially, in the case of a three-phase full-wave reluctance motor requiring a greater number of salient-poles and magnetic poles, it is normally difficult to realize a high-speed rotation and a substantial reduction of its dimensions.

Moreover, if a high-voltage electric power source is used in order to sharply build up the exciting current at an initial stage of current supply to the exciting coil, other problems occur, such as the exciting current building up too steeply when the magnetic poles reach their magnetically saturated point to causing vibrations and electric noises.

Furthermore, another problem of the conventional reluctance type motor is that a large magnetic attraction force caused between the magnetic poles and the salient-poles acts in a wrong direction in which the large magnetic attraction force cannot contribute to an output torque generation. Also, there is another problem that an extremely large torque is generated immediately after the salient poles begin to face the magnetic poles, whereas the torque becomes small shortly before the salient poles directly face the magnetic poles, thereby causing ripple of the output torque.

DISCLOSURE OF INVENTION

One of the purposes of the present invention is to provide a reluctance type motor capable of rotating at a high speed and generating a large output torque.

Another purpose of the present invention is to provide a compact-sized reluctance motor.

A further purpose of the present invention is to provide a reluctance type motor capable of supressing vibrations.

In order to accomplish the above purposes, one aspect of the present invention provides a reluctance motor having a motor main body including a rotor equipped with a plurality of salient-poles and an armature equipped with a plurality of magnetic poles respectively associated with a plurality of exciting coils. The reluctance type motor comprises a position detecting device, which has a predetermined number of position detecting elements being spaced from each other so as to correspond to said plurality of exciting coils and outputs position detecting signals successively in accordance with a rotational position of said rotor; a current supply control circuit being connected to a DC electric power source for successively activating said exciting coils in response to said position detecting signals; circuit means equipped with a plurality of capacitors for promptly discharging a magnetic energy stored in one exciting coil into a corresponding one of said plurality of capacitors so as to charge said one capacitor and rapidly extinguish the magnetic energy stored in said one exciting coil at the moment when the current supply to said one exciting coil is stopped, and steeply building up an exciting current supplied to a subsequently activated exciting coil by use of a charged voltage in said one capacitor.

And, said respective position detecting elements are disposed in such a manner that, before any one of said salient-poles begins to enter any one of said magnetic poles, the current supply is initiated to supply an exciting current to an exciting coil associated with said any one of the magnetic poles, and said position detecting device is constituted to output a position detecting signal sufficient for continuing the current supply to the exciting coil during a predetermined large electric angle. Moreover, in accordance with an another aspect of the present invention, said position detecting device is constituted to successively output a first group of position detecting signals consisting of a plurality of position detecting signals and a second group of position detecting signals consisting of a plurality of position detecting signals respectively having a predetermined phase-difference with respect to said first group of position detecting signals depending on the rotational position of said rotor. Said current supply circuit is connected to said DC electric power source so as to successively activate a first group of exciting coils in response to said first group of position detecting signals and also to successively activate a second group of exciting coils in response to said second group of position detecting signals.

In order to accomplish above third purpose, it is preferable to dispose a pair of corresponding magnetic poles, symmetrically in a diametric direction of the motor main body, and, exciting coils associated with said pair of magnetic poles are supplied with the same phase exciting currents simultaneously.

As is described above, in accordance with the present invention, a current supply is initiated well before the salient-poles begin to enter the magnetic poles and the current supply is continued during a predetermined large electric angle. Further, a magnetic energy stored in an exciting coil is utilized to charge a capacitor so as to rapidly extinguish the magnetic energy, and an exciting current supplied to a subsequently activated exciting coil is steeply built up by use of a charged voltage in said capacitor.

Therefore, the building-up and the trailing-edge of the exciting current waveform become steep, whereby a rectangular-waveform exciting current can be obtained. Furthermore, this not only enables the reluctance type motor to be driven at a high speed of approximately 100 thousand rpm but also provides a large output torque.

In accordance with a first aspect of the present invention, chiefly aimed at a half-wave current supply, it permits a reduction in the number of the salient-poles, thereby enabling the size of the motor main body to be reduced.

Furthermore, in accordance with a second aspect of the present invention, chiefly aimed at a full-wave current supply, it enables the ripple component of the motor output torque to be suppressed, thereby enabling a reduction in the vibration due to the motor rotation.

Still further, preferably, a pair of corresponding magnetic poles are disposed symmetrically in a diametric direction of the motor main body, and exciting coils associated with said pair of magnetic poles are supplied with the same phase exciting currents simultaneously. Thus, the magnetic attraction forces of said paired magnetic poles, respectively acting in a diametric direction of the motor, can be canceled with each other, thereby reducing vibrations.

BRIEF DESCRIPTION OF DRAWINGS

FIG. 9 is a circuit diagram showing a position detecting device of the second embodiment;

FIG. 11 is a graph showing torque curves generated by respective phase exciting currents in the second embodiment and other embodiments;

FIG. 12 is a schematic longitudinal cross-sectional view showing a main body of a three-phase full-wave reluctance type motor in accordance with a third embodiment of the present invention;

FIG. 18 is a schematic side view showing a rotor and an armature of a two-phase full-wave reluctance type motor in accordance with a fifth embodiment of the present invention;

FIG. 20 is a circuit diagram showing a position detecting device of the fifth embodiment;

BEST MODE FOR CARRYING OUT THE INVENTION

Figure 1:
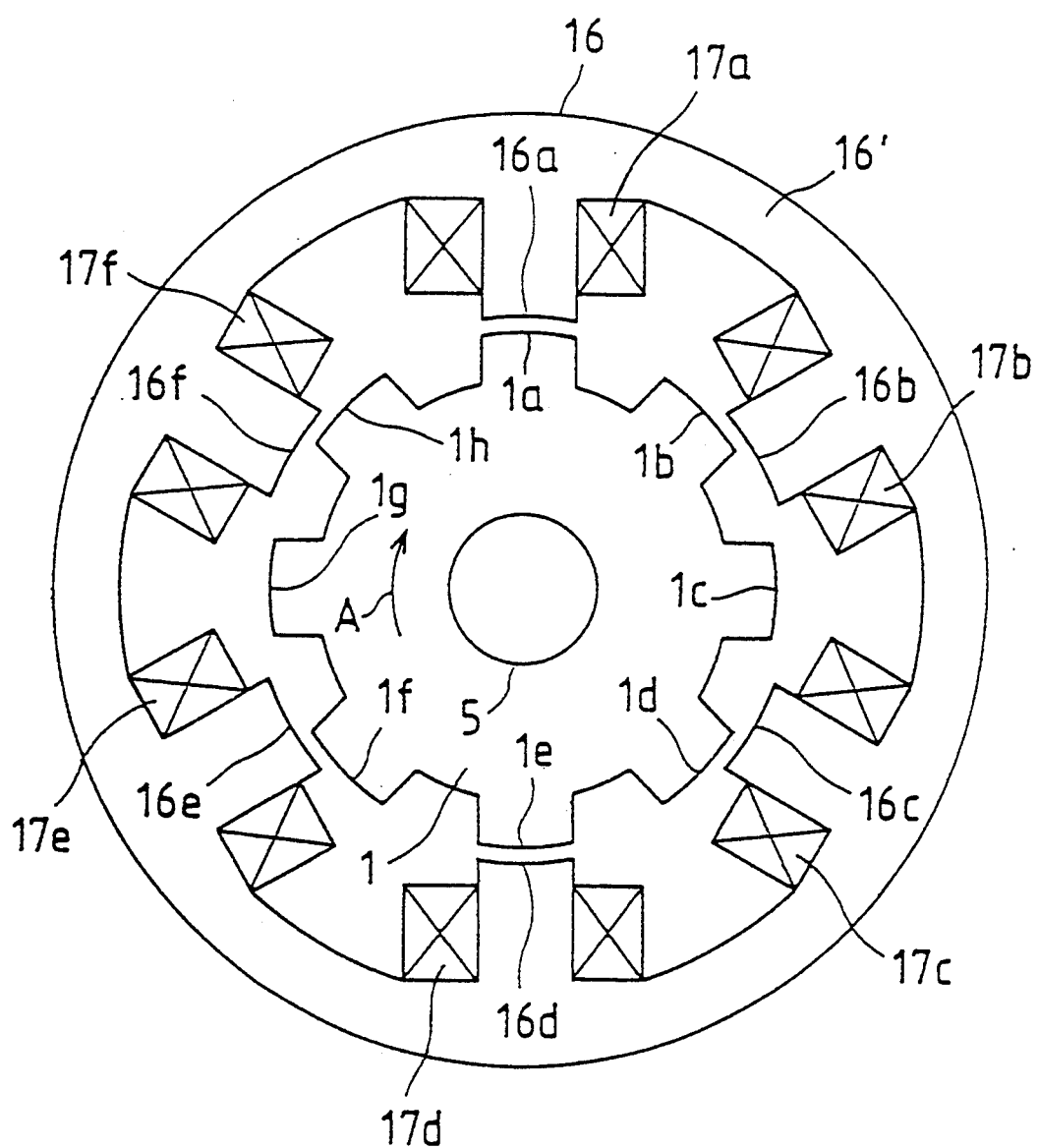
FIG. 1 is a schematic side view showing a rotor and an armature of a three-phase half-wave reluctance type motor in accordance with a first embodiment of the present invention.
Figure 2:
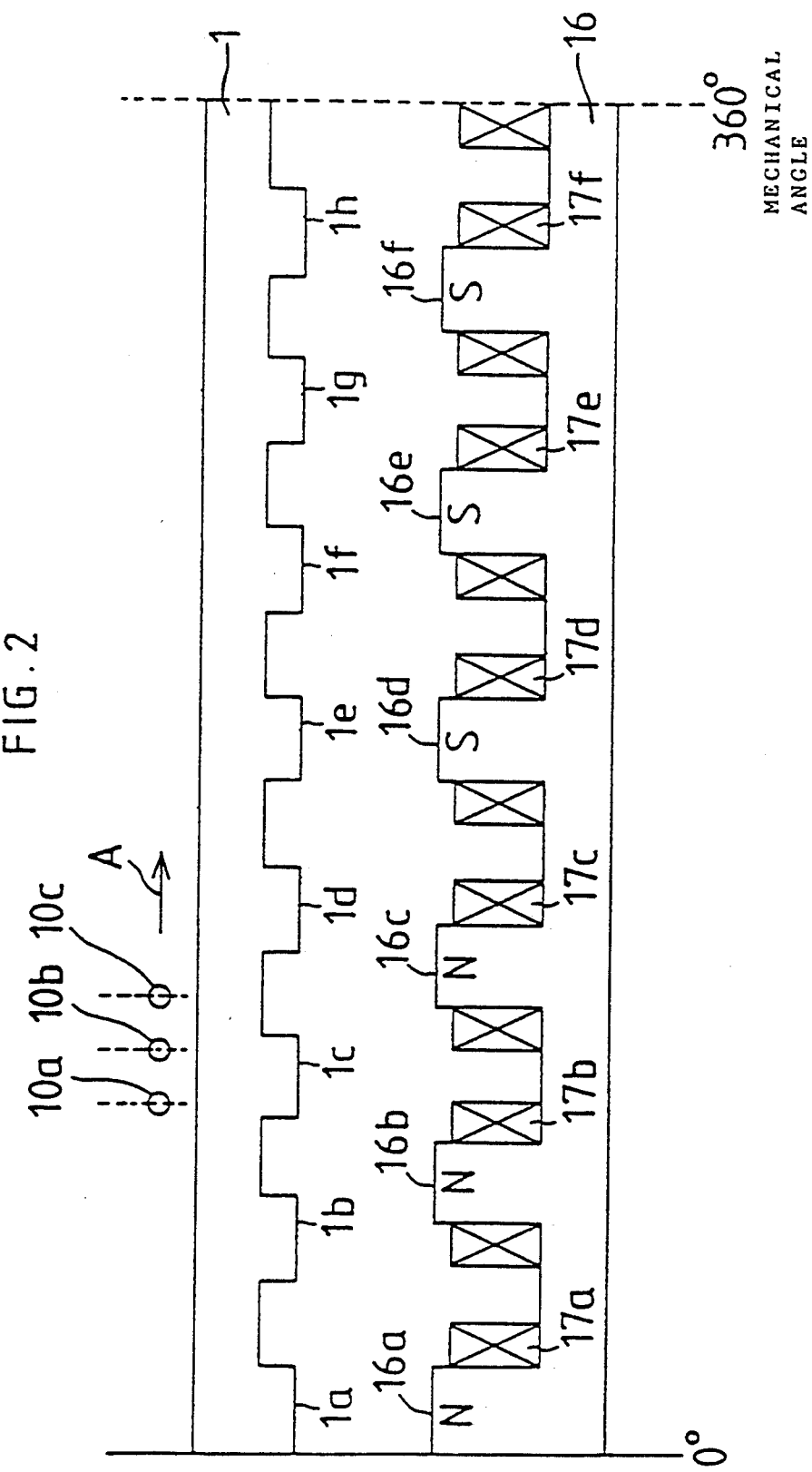
FIG. 2 is a schematic development showing the rotor and the armature of FIG. 1.

A three-phase half-wave reluctance type motor in accordance with a first embodiment of the present invention comprises a motor main body shown in FIGS. 1 and 2. The motor main body comprises a rotor 1 coupled with a rotor shaft 5 rotatably supported on bearings provided on an outer casing (corresponding to a component indicated by a reference numeral 9 in FIG. 7) and an armature (i.e., a stator) 16 disposed coaxially with the rotor 1 and fixed on the outer casing. The rotor 1 and the armature 16 are respectively made of a well-known lamination-structure silicon steel sheet.

On an outer peripheral surface of the rotor 1, eight salient-poles 1a to 1h, each having the same circumferential width of a 180-degree electric angle (hereinafter, various angular parameters are defined by the electrical angle), are formed at regular intervals of a 360-degree phase-difference in a circumferential direction. Moreover, the armature 16 has a circular magnetic core 16′, which freely forms a magnetic path, and six magnetic poles 16a to 16f, each having the same circumferential width of 180 degrees, are formed at regular intervals in a circumferential direction on an inner peripheral surface of the magnetic core. Tip (i.e., distal) ends of the magnetic poles 16a to 16f and their opposing salient-poles 1a to 1h are disposed to face each other over an air gap of 0.1 to 0.2 mm, e.g., approximately 0.15 mm.

These magnetic poles 16a to 16f are associated with exciting coils 17a to 17f, respectively. The exciting coils 17a and 17d are connected with each other in series or in parallel. Hereinafter, this connected unit is referred to as a first phase exciting coil pair 39a. The exciting coils 17b and 17e and the exciting coils 17c and 17f are connected in the same fashion as the first phase exciting coil pair 39a. These connected units are referred to as a second phase exciting coil pair 39b and a third phase exciting coil pair 39c respectively.

Figure 3:
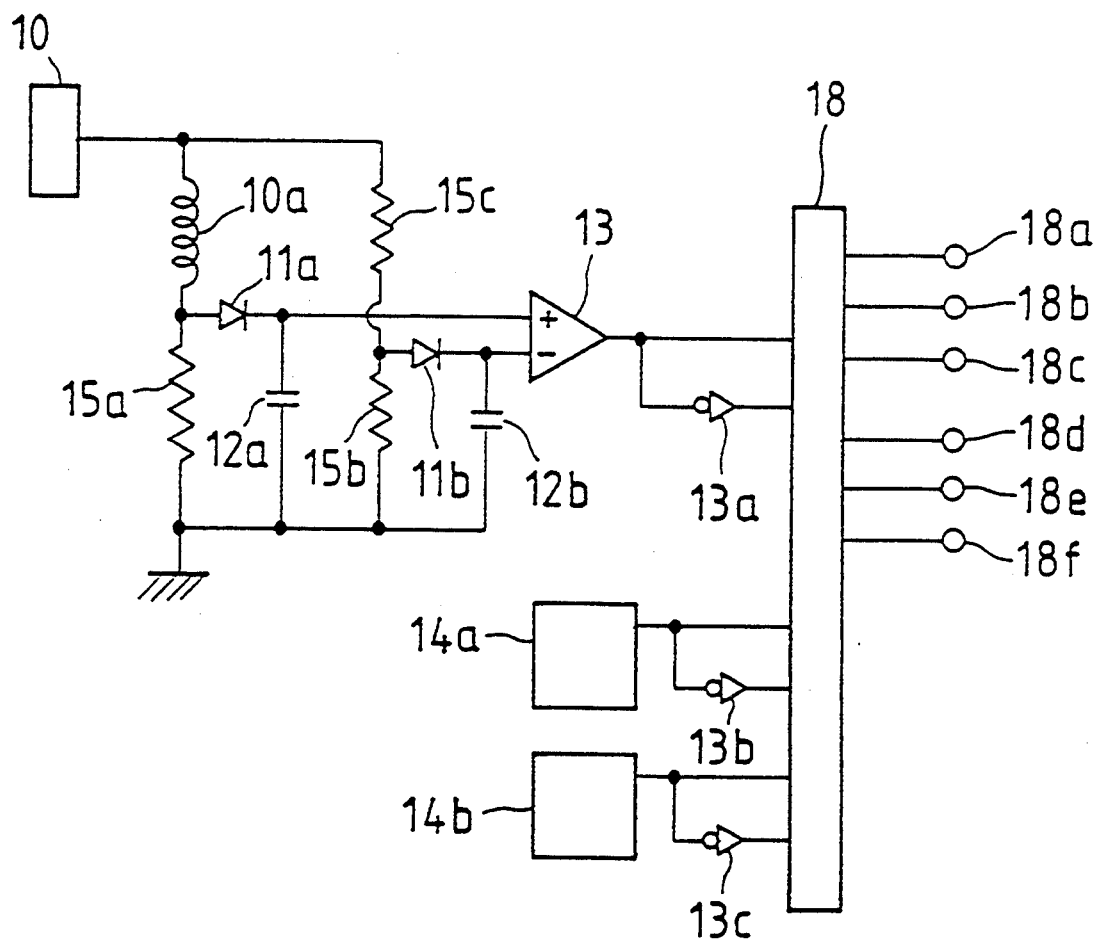
FIG. 3 is a circuit diagram showing a position detecting device of the first embodiment.

The motor comprises a position detecting device shown in FIG. 3. This position detecting device includes three detecting coils 10a to 10c (FIG. 2), each comprising an air-core coil of approximately 100 turns having a 5 mm diameter for detecting rotational positions of salient-poles 1a to 1h of the rotor 1. These detecting coils are respectively spaced by an amount of 120 degrees with respect each other, and respective coil surfaces are fixed on the armature 16 so as to face the side surfaces of the salient-poles 1a to 1h while keeping air gaps. Furthermore, the position detecting device includes an oscillator 10 having an oscillation frequency of approximately 1 MHz and bridge circuits respectively relating to the detecting coils 10a to 10c.

A bridge circuit relating to the detecting coil 10a comprises resistances 15a to 15c. This bridge circuit is adjusted to balance in a condition where the detecting coil 10a does not face any of the salient-poles 1a to 1h. This bridge circuit is connected to two low-pass filters comprising diodes 11a and 11b and capacitors 12a and 12b, an operational amplifier 13, and a logic circuit 18.

The logic circuit 18 is constituted by a conventional circuit for a three-phase Y-type semiconductor motor, and has six output terminals 18a to 18f. In more detail, the diode 11a has its anode connected to the connecting point of the coil 10a and the resistance 15a and its cathode connected to the positive input terminal of the operational amplifier 13 and one end of the capacitor 12a, the other end of capacitor 12a being grounded. And, the diode 11b has its anode connected to the connecting point of the resistances 15b and 15c and its cathode connected to the negative input terminal of the operational amplifier 13 and one end of the capacitor 12b, the other end of capacitor 12b being grounded. An output terminal of the operational amplifier 13 is connected not only to an input terminal of the logic circuit 18 but to an input terminal of an inversion circuit 13a interposed between them.

In FIG. 3, reference numerals 14a, 14b denote circuits relating to coils 10b, 10c respectively. Each circuit consists of circuit components corresponding to those of the coil 10a such as a bridge circuit, low-pass filters and an operational amplifier. These circuits 14a, 14b are connected to the oscillator 10 which is commonly provided for all three detecting coils 10a, 10b, and 10c. Numerals 13b and 13c denote the inversion circuits corresponding to inversion circuit 13a.

As shown above, the bridge circuit of the position detecting device is designed to be balanced when the detecting coils 10a to 10c do not face to any one of the salient-poles 1a to 1h of the rotor 1. Accordingly, when the detecting coil 10a does not face any one of the salient-poles 1a to 1h, an output of the low-pass filter comprising the diode 11a and the capacitor 12a becomes equal to an output of the low-pass filter comprising the diode 11b and the capacitor 12b. Therefore, an output of the operational amplifier 13 becomes a LOW-level. Actually, however, when the motor is stopped, one of the detecting coils faces one of the salient-poles.

Accordingly, for example in the case that the detecting coil 10a faces any one of salient-poles, an impedance of the detecting coil 10a decreases due to core loss (i.e., eddy loss and hysteresis loss). Therefore, a voltage drop in the resistance 15a becomes large, and an applied voltage to the positive input terminal of the operational amplifier 13 increases to turn the output of the operational amplifier 13 into a HIGH-level as indicated by the reference numerals 33a, 33b in FIG. 5. That is, in accordance with a rotation of the rotor 1, rectangular waveform signals 33 are sent out from the operational amplifier 13. On the other hand, the inversion circuit 13a sends out rectangular-waveform signals (not shown) corresponding to the inverted signal of the rectangular-waveform signals 33.

In the same way, when each of the detecting coils 10b, 10c faces the side surface of any one of salient-poles 1a to 1h, the output of the operational amplifiers in the blocks 14a, 14b are turned into a HIGH-level (as indicated by the reference numerals 34a, 34b, 35a, and 35b). And, in accordance with the rotation of the rotor 1, rectangular waveform signals 34, 35 are sent out from both operational amplifiers, respectively. Furthermore, the inversion circuits 13b and 13c send out rectangular waveform signals (not shown) corresponding to the inverted signals of the rectangular waveform signals 34 and 35. These rectangular waveform signals 33, 34, and 35 have a phase-difference of 120 degrees with each other.

Output terminals 18a to 18f of the logic circuit 18, which receives as inputs the rectangular waveform signals 33 to 35 and the rectangular waveform signals corresponding to their inverted signals, output rectangular waveform position detecting signals 36~38 and 43~45 (FIG. 5) representing rotational positions of the rotor 1. There are 180-degree phase differences between the signals 36 and 43, between signals 37 and signal 44, and between the signals 38 and 45. The signals 36~38 and signals 43~45 have a 120-degree phase difference with each other.

Figure 4:
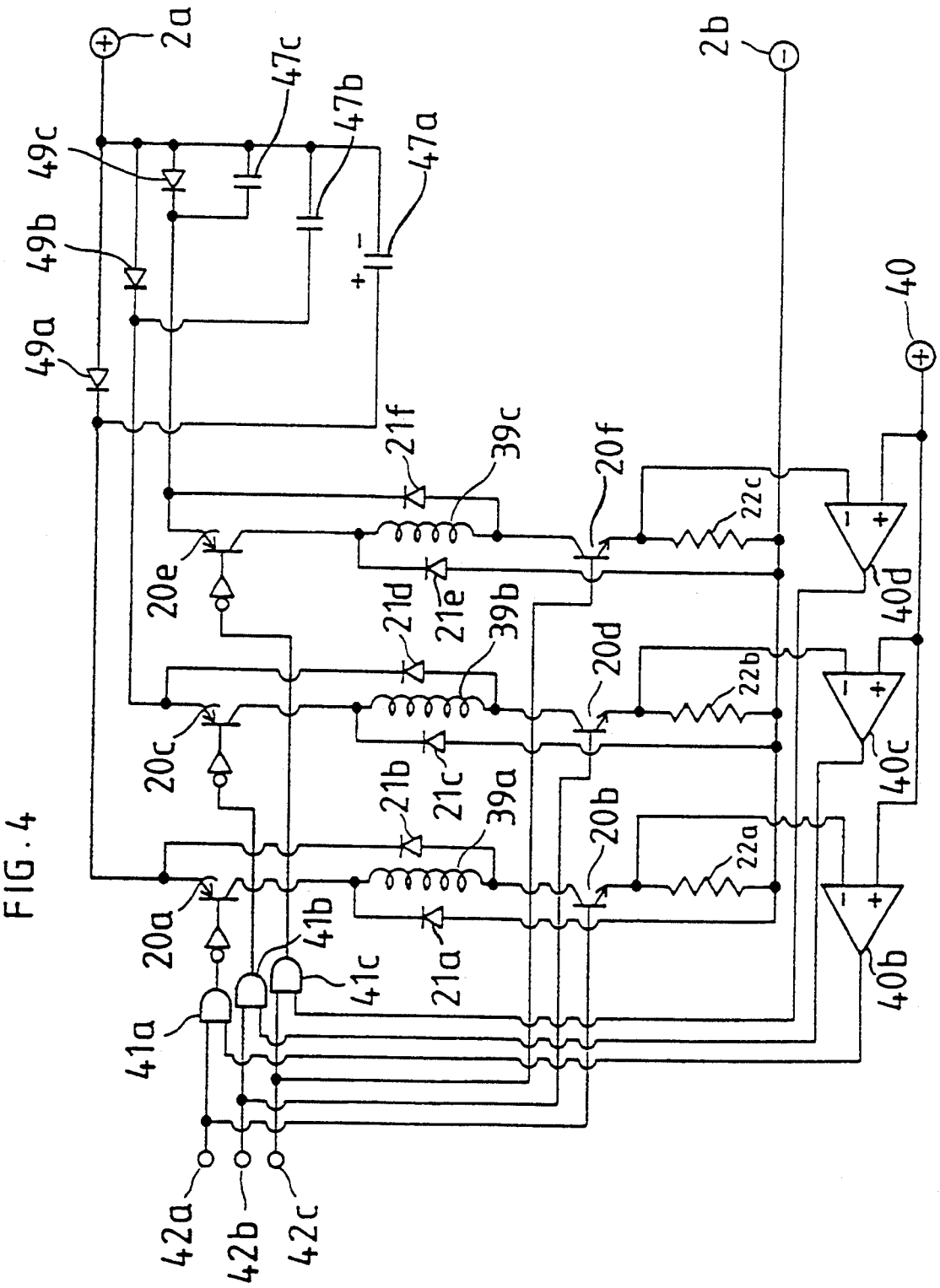
FIG. 4 is a circuit diagram showing a current supply control circuit used in the first embodiment.

The motor further comprises a current supply control circuit shown in FIG. 4 to supply and cut off the exciting current to the exciting coils 17a to 17f, that is, the first to third phase exciting coil pairs 39a to 39c.

Input terminals 42a to 42c of the current supply control circuit are connected, on one hand, to output terminals 18a to 18c of the position detecting device, and also connected, on the other hand, to one input terminal of AND circuits 41a, 41b, and 41c of the current supply control circuit respectively. And the other input terminal of the AND circuits 41a to 41c are connected to a standard voltage input terminal 40 to which a standard voltage is applied, through operational amplifiers 40b, 40c and 40d, the standard voltage variably controlling the output torque of the motor through the operational amplifiers 40b, 40c, and 40d, which constitute later-described chopper circuits together with the AND circuits.

Further, output terminals of the AND circuits 41a to 41c are connected through inversion circuits to the bases of transistors (i.e. switching elements) 20a, 20c and the transistors 20a, 20c and 20e are interposed respectively between back-flow preventing diodes 49a, 49b and 49c, which are connected to a positive terminal 2a of the DC power source, and first ends of the first to the third phase exciting coil pair 39a to 39c. These diodes 49a to 49c are connected to the DC electric power in a forward direction, and capacitors 47a, 47b, and 47c are connected parallel to diodes 49a through 49c.

The second ends of the first to the third phase exciting coil pairs 39a to 39c are connected through transistors 20b, 20d, 20f and resistances 22a, 22b and 22c, respectively, to a negative terminals 2b of the DC power source, and also to negative terminals of the operational amplifiers 40b, 40c, and 40d. The resistances 22a, 22b, and 22c are provided to detect actual exciting current values flowing into the first to the third phase exciting coil pairs 39a to 39c. First ends of the resistances 22a, 22b, and 22c are connected to the emitters of the transistors 20b, 20d and 20f, and the other ends are connected to anodes of diodes 21a, 21c, and 21f. Cathodes of these diodes 21a, 21c, and 21f are connected to first ends of the first to the third phase exciting coil pairs 39a to 39c. Diodes 21b, 21d and 21f are interposed between the second ends of the first to the third phase exciting coil pairs 39a to 39c and the positive terminal 2a of the DC power source.

Hereinafter, an operation of the reluctance type motor, constituted as described above, will be explained. When the motor is turned on, an electric current is supplied from the positive and negative terminals 2a and 2b of the DC power source to the current supply circuit (FIG. 4). Furthermore, negative input terminals of the operational amplifiers 40b to 40d are applied with voltages lower than the voltages applied to their positive input terminals. HIGH-level signals are applied from the operational amplifiers 40b~40d to the AND circuits 41a to 41c to open the gates of these AND circuits. As is described above, when the motor is started, any one of the detecting coils 10a to 10c of the position detecting device faces any one of the salient-poles 1a to 1h of the rotor 1 of the motor.

In such a condition, for example, when the second phase position detecting signal 37a of a HIGH-level is applied from the position detecting device to an input terminal 42b of the current supply control circuit (FIG. 4), a HIGH-level signal 34a is applied to the base of the transistor 20d. And, a HIGH-level output sent out from the opened AND circuit 41b, is converted into a LOW-level output through the inversion circuit and, in turn, applied to the base of the transistor 20c. Accordingly, the transistors 20c and 20d are activated to energize the exciting coils 17b and 17e (the second phase exciting coil pair 39b).

As a result, magnetic poles 16b and 16f of the armature 16 are magnetized. Accordingly, the salient-poles 1b and 1f are attracted by a magnetic force to cause the rotor 1 to rotate in a direction indicated by an arrow A in FIG. 1. After that, if the rotor 1 rotates 120 degrees, the second phase position detecting signal 37 becomes a LOW-level and, at the same time, the third phase position detecting signal 38a of a HIGH-level is applied to the input terminal 42c of the current supply control circuit. This causes the transistors 20c and 20d to be turned off to cut off the supply of current to the exciting coil pair 39b, whereas the transistors 20e and 20f are turned on to energize the exciting coil pair 39c.

If the rotor 1 further rotates 120 degrees, the transistors 20e and 20f are turned off to cut off supply of current to the exciting coil pair 39c, whereas the transistors 20a and 20b are turned on to activate the exciting coil pair 39a.

Thus, a current supply mode is subject to a cyclic alternation occurring at intervals of a 120-degree revolution and in the following order: the exciting coil pair 39a→the exciting coil pair 39b→ the exciting coil pair 39c. As a result, the exciting coil pairs 39a to 39c are successively and continuously supplied with exciting current to cause the motor to generate output torque.

In this case, a pair of magnetic poles being symmetrically positioned are magnetized oppositely to be an N-pole and an S-pole, respectively. Accordingly, leaking magnetic fluxes passing non-excited magnetic poles will take directions opposite to each other, since excited two magnetic poles always have opposite polarities, and this prevents the occurrence of a counter torque.

As long as each of the phase shifting coils is energized, respectively, for example, while the first phase position detecting signal 36a of a HIGH-level is generated to activate the first phase exciting coil pair 39a, if a voltage applied across the resistance 22a representing an exciting current flowing through the exciting coil pair 39a exceeds a set value corresponding to the standard voltage, which is applied to the positive input terminal of the operational amplifier 40b through the variable standard voltage input terminal 40 in the current supply control circuit of FIG. 4, an output of the operational amplifier becomes a LOW-level and the gate of the AND circuit 14a closes to deactivate the transistor 20a.

Subsequently, when the exciting current reduces down to a predetermined value determined by hysteresis characteristics of the operational amplifier 40b, the output of the operational amplifier returns to a HIGH-level so as to activate the transistor 20a again, thereby causing exciting current to flow.

Figure 6:
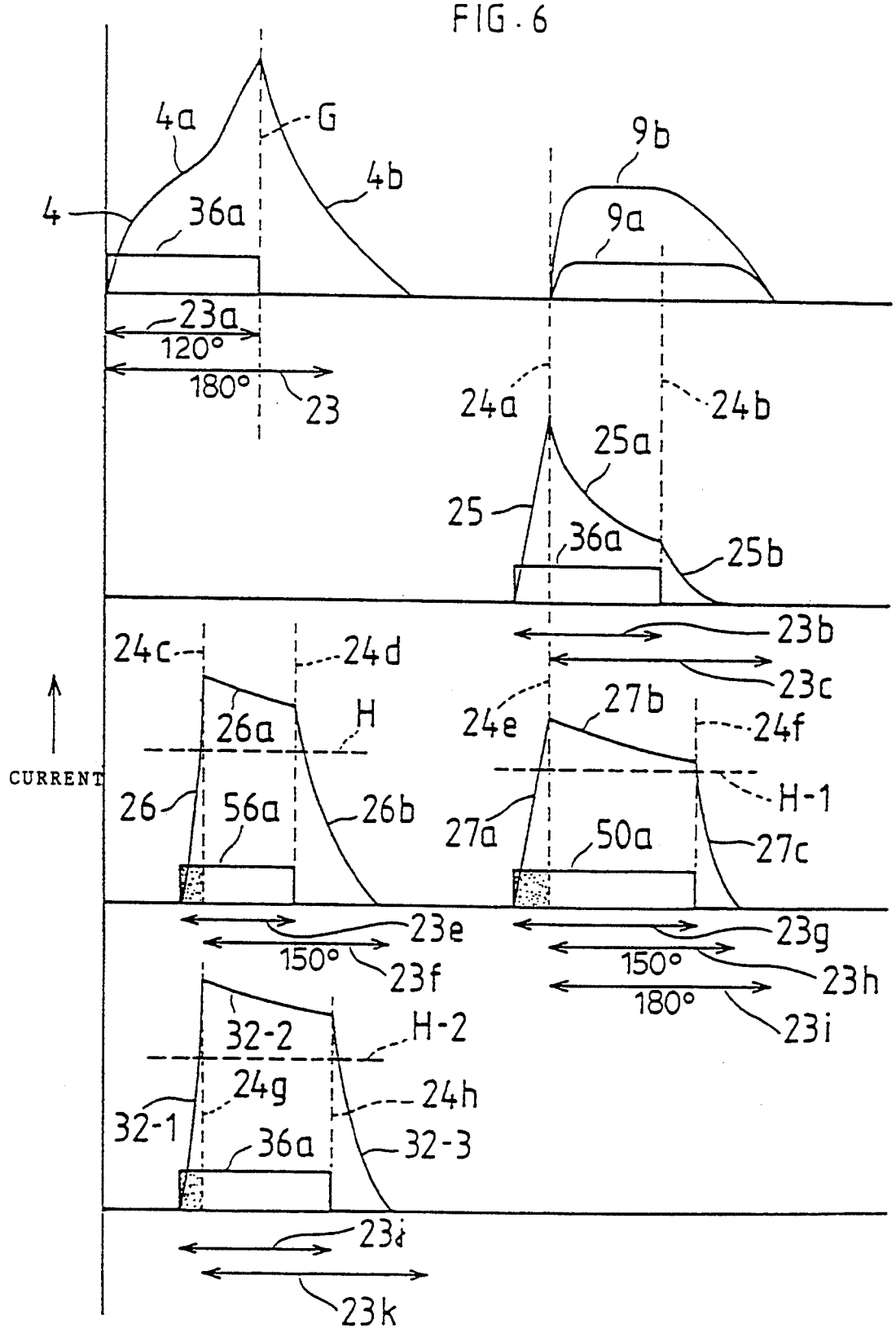
FIG. 6 is a timing chart showing position detecting signals, motor output torque curves, and exciting current curves of the first embodiment, together with corresponding position detecting signals, motor output torque curves, and exciting current curves of other embodiments.

In this manner, the operational amplifier 40b cooperates with the AND circuit 41a to activate or deactivate the transistor 20a on the basis of a comparison between the exciting current and the above set value to control the exciting current, for example, to a value indicated by a reference mark H-2 in FIG. 6 corresponding to the voltage applied to the standard voltage terminal, thereby controlling the output torque of the motor. Furthermore, the exciting current becomes a rectangular waveform and thus a large output torque can be obtained. The same explanation applies to the second and third phases. Thus, the operational amplifiers 40b to 40c function as chopper circuits together with the AND circuits 14a to 14c.

Next, referring to FIG. 6, the operational features of the motor according to the present embodiment will be explained.

In a conventional motor which does not include back-flow preventing diodes 49a~49c and capacitors 47a~47c and also does not adopt an advanced phase current supply operation, for example, if the first phase exciting coil pair 39a is supplied with an exciting current throughout the duration corresponding to a 120-degree width of the first phase position detecting signal 36a shown by an arrow 23a in FIG. 6, a large inductance is generated since the salient-poles begin to enter the magnetic poles to close a magnetic path between the salient-poles and magnetic poles. Therefore, the exciting current builds up with some delay as is shown by a first half 4a of the curve 4. For this reason, an output torque of the motor decreases. More specifically, a phenomenon of torque reduction occurs.

Furthermore, when the current supply is stopped, a magnetic energy stored in the exciting coil pair 39a is returned to the DC electric power source. Therefore, the exciting current trails off gradually as shown by a second half 4b of the curve 4 within the positive torque generating section 23 of 180 degrees to generate the counter torque. Thus, the conventional motor is poorer in operational efficiency and its output torque is reduced. Specifically, the above phenomenon appears remarkably in a high speed region in which time width of the counter torque generating section remains unchanged but time width of the positive torque generating section varies inversely proportionally to the rotational speed of the motor. This deteriorates the applicability of the motor. The same phenomenon is recognized as to the second-phase exciting coil pair 39b and the third-phase exciting coil pair 39c.

In the above conventional motor, if a so-called advanced phase current supply operation is applied by advancing the phase of the current to be supplied to the exciting coil by 30 degrees before the salient-poles enter the magnetic poles, the exciting current varies as shown by curves 25, 25a, and 25b of FIG. 6. That is, since the magnetic path of the magnetic pole is not closed at the beginning of the current supply section, the exciting current builds up steeply as shown by the curve 25. Then, at a time point shown by a reference numeral 24a when the salient-poles enter the magnetic poles, the magnetic path of the magnetic poles is closed to increase the inductance and thus the exciting current decreases sharply as shown by the curve 25a.

Then, after a time point shown by a reference numeral 24b when the position detecting signal 36a of an H-level is extinguished, the magnetic energy stored in the first-phase exciting coil pair 39a is discharged, and the exciting current decreases as shown by the curve 25b. An arrow 23b denotes the width (120 degrees) of the H-level signal 36a, and an arrow 23c denotes the positive torque generating section.

By carrying out the advanced-phase current supply operation in this manner, it becomes possible to steeply build up the exciting current and also to reduce the counter torque. However, as is apparent from a comparison between a torque curve 9a representing torque characteristics in the case of a small exciting current and a torque curve 9b representing torque characteristics in the case of a large exciting current, rapid reduction of the exciting current shown by the curve 25a causes a substantial reduction of the motor output torque.

If the voltage of the DC electric power source is increased in order to increase its output torque, a peak value of the exciting current increases in its build-up section 25 to cause damage to the transistors 20a and 20b or generation of electric noises, thereby spoiling the practical performance of the motor.

Figure 5:
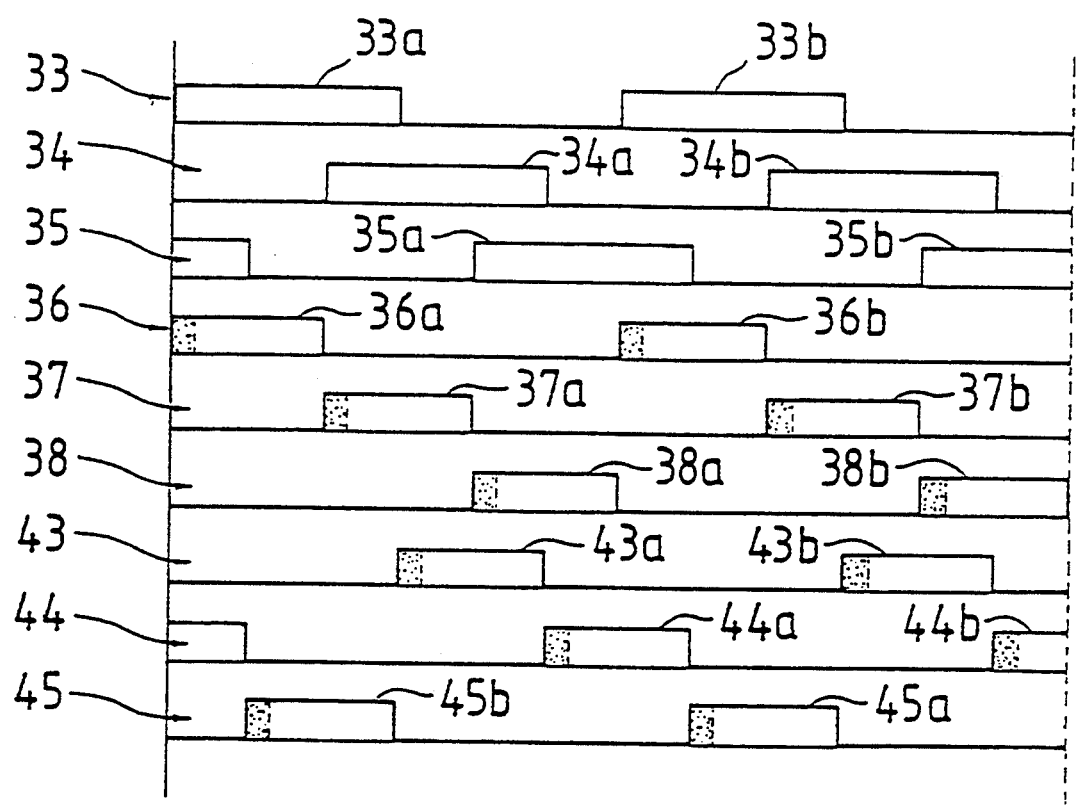
FIG. 5 is a timing chart showing outputs of the detecting coils shown in FIG. 2 and position detecting signals supplied from the position detecting device shown in FIG. 3.

Thus, in the present embodiment, not only is the advanced-phase current supply operation (shaded portions in FIGS. 5 and 6 show the advance-phased sections) applied to the reluctance motor but also the backflow preventing diodes 49a~49c and capacitors 47a~47c are provided to the motor. With this constitution, when the H-level position detecting signal 36a is extinguished, and the transistors 20a and 20b are deactivated to stop the current supply to the first phase exciting coil pair 39a, the magnetic energy stored in the exciting coil pair 39a is prevented from returning to the DC electric power source by the backflow preventing diode 49a, and this magnetic energy charges the capacitor 47a to the polarities shown in FIG. 4. As a result, the magnetic energy extinguishes rapidly, and the exciting current correspondingly shows a steep trailing-off as shown by a curve 32-3 in FIG. 6.

After that, in response to the position detecting signal 36b (FIG. 5) of an H-level, the transistors 20a and 20b are activated again to resume the current supply to the first-phase exciting coil pair 39a, whereby a large voltage equal to the sum of the voltage of the DC electric power source and the charged voltage of the capacitor 47a is applied to the exciting coil pair 39a. Consequently, the exciting current builds up rapidly as shown by a curve 32-1 in FIG. 6. After the time point indicated by a broken line 24g when the salient-poles enter the magnetic poles, the inductance increases, however, since both the voltage of the DC electric power source and the charged voltage of the capacitor 47a are applied to the exciting coil pair 39a, the exciting current reduces gradually as shown by the curve 32-2.

The same phenomenon can be recognized as to the second-phase exciting coil pair 39b and the third-phase exciting coil pair 39c. Thus according to this embodiment, both torque reduction and counter torque are suppressed, and the exciting current of a rectangular waveform is obtained. As a result, not only the can motor be driven at a higher speed but also a large output torque can be obtained.

By the way, a smaller advanced-phase angle is preferable for increasing a driving efficiency of the motor. For instance, in the case of this embodiment, the advanced-phase angle of about 10 degrees is good enough. Furthermore, in the case where a large output torque is not required, the advanced-phase control is not mandatory, and thus the advanced-phase angle may be set to 0. Where a large output torque is required, however, the advanced-phase angle needs to be increased up to 30 degrees.

The above embodiment can be modified variously. For example, in order to reduce the leaking magnetic flux, each of the magnetic poles 16a~16f may compromise paired magnetic poles so that they can be magnetized to an N-pole and an S-pole, respectively. With this arrangement, the leaking magnetic flux of respective paired magnetic poles can be canceled with each other. Thus, the leaking magnetic flux can be eliminated. In this case, the rotor 1 is provided with 16 salient-poles. A motor modified according to this embodiment can output twice as large as the output torque of the previous embodiment.

Furthermore, in order to detect the position of the rotor 1, an aluminum plate having the same configuration as the salient-poles portion of the rotor 1 and capable of synchronously rotating with the rotor 1 may be used.

Next, with reference to FIGS. 7 to 11, a three-phase half-wave reluctance type motor in accordance with a second embodiment of the present invention will be explained in detail.

Compared with the first embodiment, a motor of this embodiment differs from the first embodiment chiefly in that the diameter of the motor main body is reduced and the current supply section for the exciting coil is widened. In the following description, the explanation for the same or common constitutions and functions as those of the first embodiment is omitted here.

Figure 7:
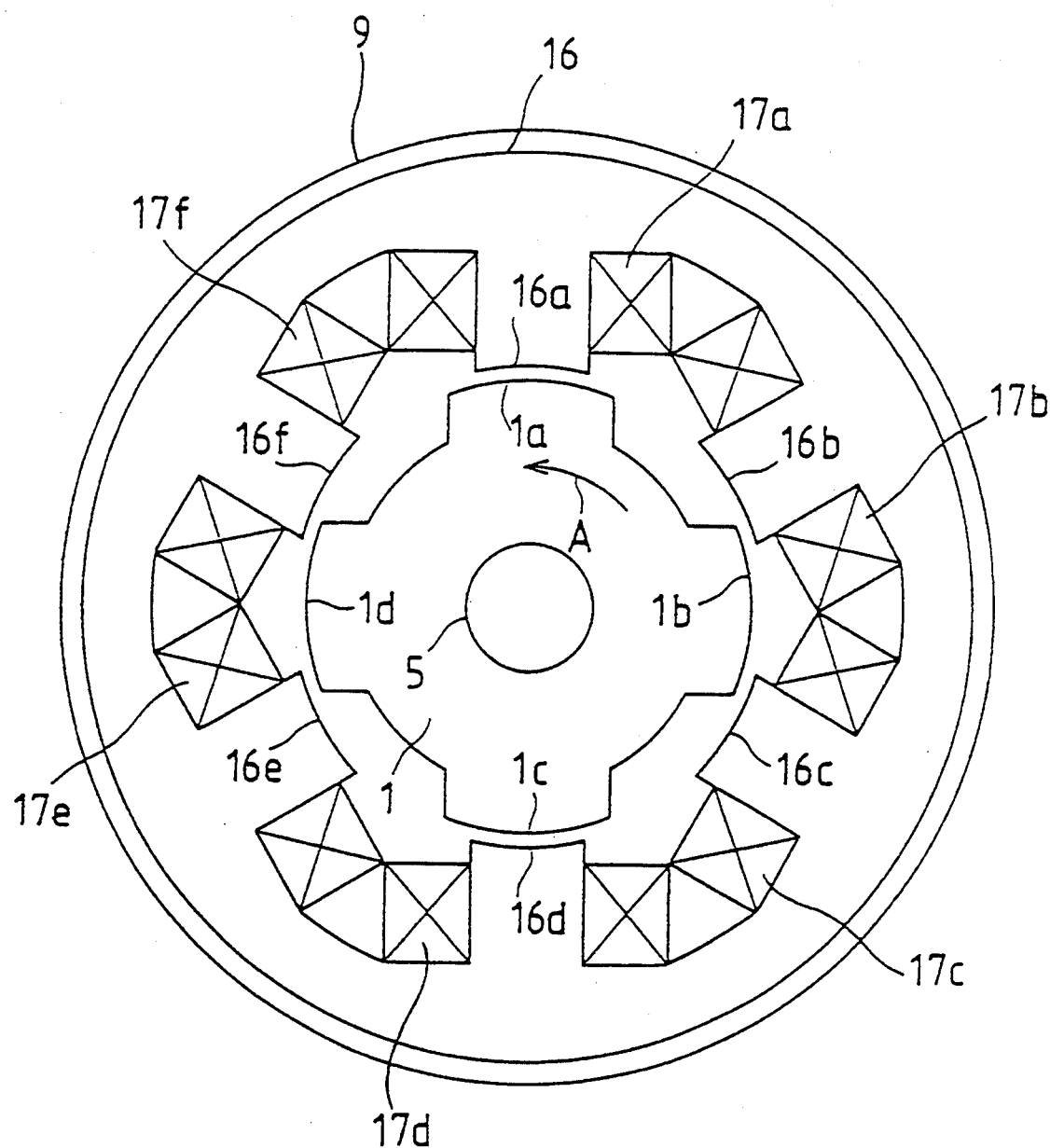
FIG. 7 is a schematic side view showing a rotor and an armature of a three-phase half-wave reluctance type motor in accordance with a second embodiment of the present invention.
Figure 8:
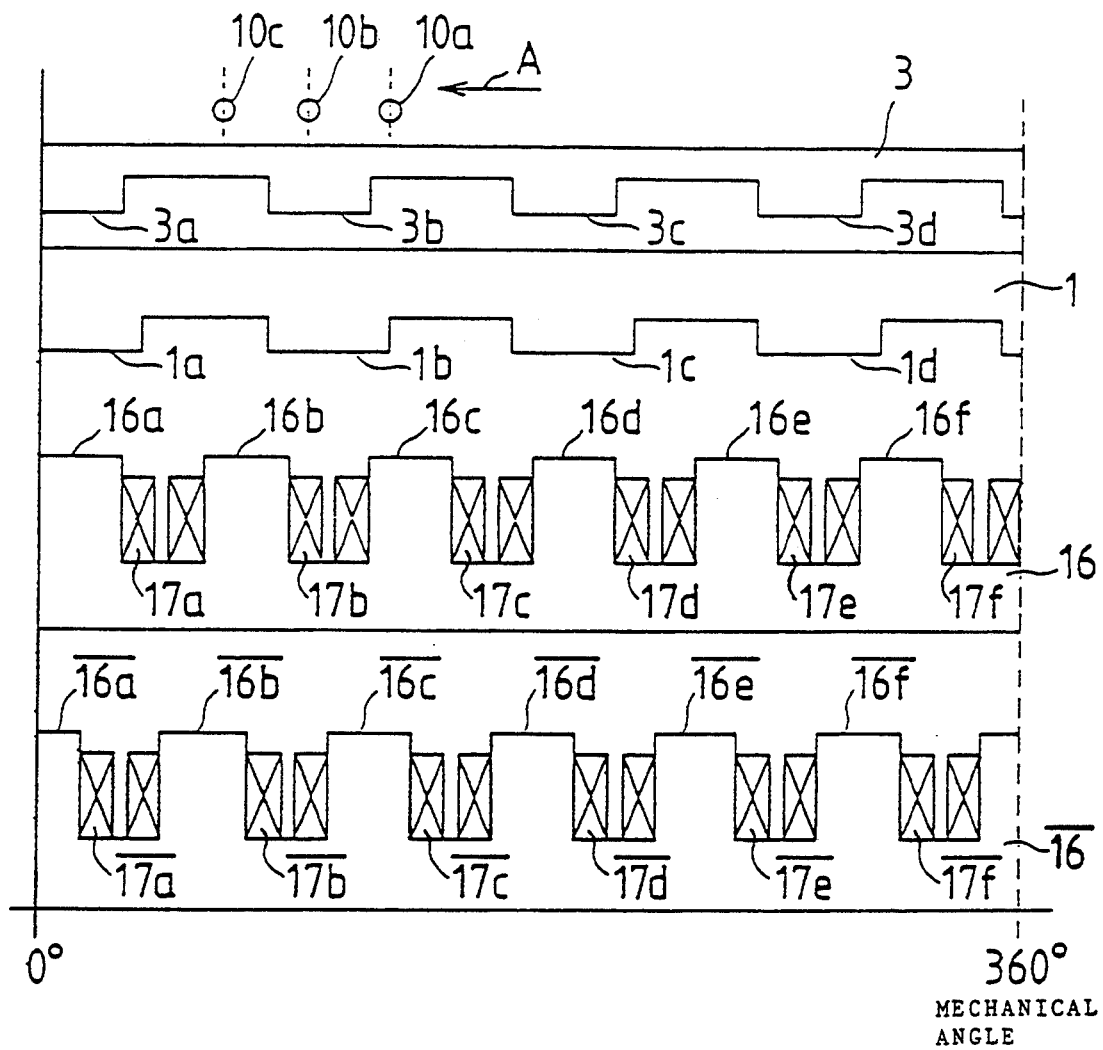
FIG. 8 is a schematic development showing the rotor and the armature of FIG. 7 together with a disk plate.

As shown in FIG. 7, the rotor 1 is formed with 4 salient-poles 1a~1d with 360-degree phase difference from each other, each having a width of 180 degrees. In this case, the reason why the number of salient-poles is reduced to four is to reduce the diameter of the rotor 1. Six magnetic poles 16a~16f have a width of 120 degrees, respectively. In such a manner, an installation space for the exciting coils can be reduced to increase the space for the installation of the magnetic poles in a limited space of the motor casing. In FIG. 7, a reference numeral 9 denotes an outer casing. Moreover, as shown in FIG. 8, there is provided a conductive disk plate 3 rotatable synchronously with respect to the rotor 1, and the disk plate 3 has a peripheral portion 3 formed with protruding portions 3a~3d, each having a 150-degree width.

The coils 10a~10c have coil surfaces disposed facing the protruding portions 3a~3d. Furthermore, a circuit section cooperates with the coils 10a~10c to constitute a position detecting device as shown in FIG. 9. A circuit corresponding to the coil 10a has the same construction as the counterpart shown in FIG. 3, and thus its explanation is omitted here. In FIG. 9, circuits relating to the coils 10b and 10c are simply shown as blocks B and C respectively.

Figure 10:
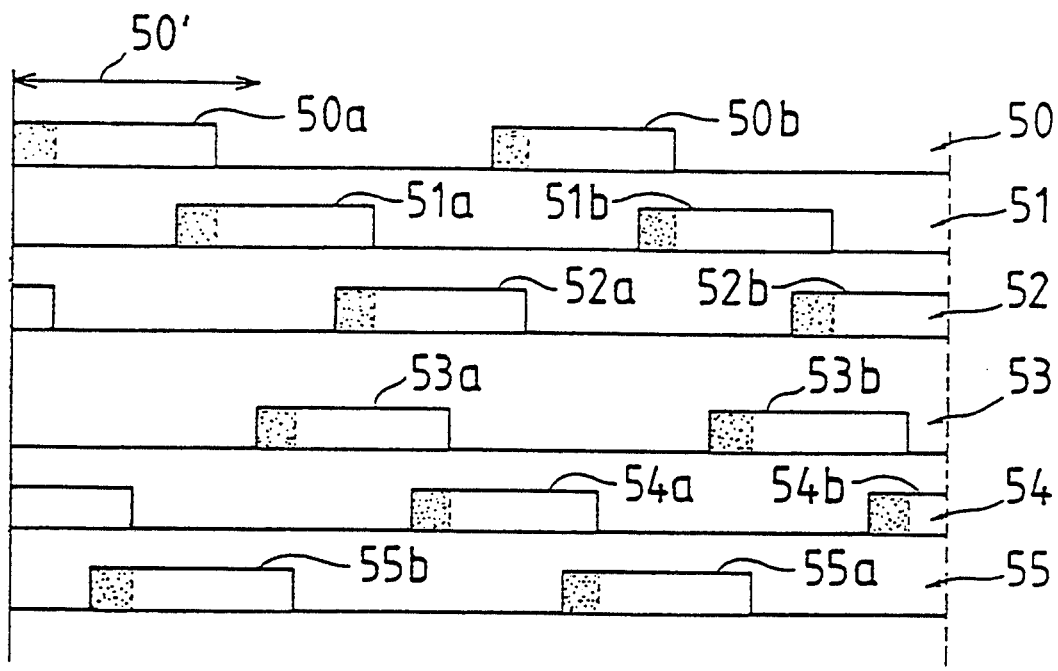
FIG. 10 is a timing chart showing position detecting signals supplied from the position detecting device shown in FIG. 9.

FIG. 10 shows the position detecting signals 50, 51 and 52 which are supplied from the output terminals 13-1, 13-2 and 13-3 of the position detecting device to the input terminals 42a~42c of the current supply circuit (FIG. 4). Suffix characters a and b denote an H-level condition of the position detecting signal. A width of the H-level signal is 150 degrees. A phase difference between adjacent H-level signals is 360 degrees. In FIG. 10, shaded portions of the H-level signals represent advanced-phase sections. Motor output torque curves 28a, 28b and 28c, respectively corresponding to the H-level position detecting signals 50a, 51a and 52a are shown in FIG. 11.

As is apparent from the drawing, the width of the torque curve being sufficiently large, the dead point at the starting point of time will not occur even when the width of the magnetic pole has been set to a small value such as 120 degrees. It is recommended to obtain the maximum output torque to adjust the position detecting elements 10a~10c.

Hereinafter, with reference to FIG. 12, a three-phase full-wave reluctance type motor in accordance with the third embodiment of the present invention will be explained.

By providing two sets of the rotor and the armature of the second embodiment shown in FIG. 7 which function as a three phase half wave motor, respectively, the motor of this embodiment is characteristic of functioning, as a whole, as a three-phase full-wave motor. The width of the current supply section is 120 degrees.

This motor comprises a cylindrical outer casing 9. Both of the end surfaces of the outer casing 9 are closed by the outer casing side plates 9c and 9c, which are respectively provided with ball bearings 70a and 70b for supporting a rotational shaft 5. The rotational shaft 5 is coupled with a first rotor 1-1 and a second rotor 1-2, which correspond to the rotor 1 of FIG. 7. Further, a first armature 16 and a second armature $\overline{16}$, corresponding to the armature 16 of FIG. 7, are inserted in the outer casing 9. Six magnetic poles are formed on an inner peripheral surface of the armatures 16 and 16 facing, through air gaps, 4 salient-poles formed on an outer peripheral surface of a corresponding one of the first and second rotors 1-1 and 1-2, where these six magnetic poles are associated with exciting coils. FIG. 12 shows only the magnetic poles 16a, 16d, $\overline{16a}$ and $\overline{16d}$, and the exciting coils 17a, 17d, $\overline{17a}$ and $\overline{17d}$. Salient-poles of both rotors, corresponding with each other are formed on the same phase positions with each other.

Then, the magnetic poles of the second armature $\overline{16}$ are formed to be positioned with a 60-degree phase difference with respect to the corresponding magnetic poles of the first armature 16, respectively. Further, the aluminum disk plate 3 is secured on the rotor shaft 5. Four protruding portions having the same configuration as the four salient-poles are formed on the peripheral portion of the disk plate 3, whereas three position detecting coils (a reference numeral 10a denotes one of these position detecting coils) are disposed facing the outer peripheral surface of the protruding portion.

The position detecting device has the same constitution as one shown in FIG. 3. The position detecting device is constituted in such a manner that the position detecting signals 43, 44 and 45 shown in FIG. 5 are supplied from the output terminals 18d, 18e and 18f to the input terminals 42a, 42b and 42c of the current supply circuit having the same constitution as one shown in FIG. 4. Two current supply circuits are used in this embodiment.

The motor of this embodiment is basically driven in the same manner as the first and the second embodiments. The first rotor 1-1 and the first armature 16 cooperate together with the position detecting device and one current supply control circuit to function as a three-phase half-wave motor, whereas the second rotor 1-2 and the second armature $\overline{16}$ cooperate together with the position detecting device and the other current supply control circuit to function as an another three-phase half-wave motor. As a result, the motor serves as a three-phase full-wave motor having a small ripple in its output torque. Furthermore, a motor can be made available as one having a long body featuring its compactness and small diameter.

This embodiment can be modified variously.

For example, the above embodiment provides the first and the second rotors 1-1 and 1-2 independently, but they may be provided integrally. Furthermore, the corresponding salient-poles on the first and the second rotors are formed at the same phase position, whereas the corresponding magnetic poles of the first and the second armatures are disposed to have a 60-degree phase-difference with each other, but this may be reversed by differentiating the phases of the corresponding salient-poles on the first and the second rotors by 60-degree whereas the corresponding magnetic poles of the first and the second armatures are disposed at the same phase position.

Furthermore, the above embodiment constitutes a three-phase full-wave motor by combining two sets of three-phase half-wave motors, but it is also possible to combine n (>3) sets of three-phase half-wave motors. In this case, rotors of n sets of half-wave motors are provided to have the same phase position, whereas the armatures of respective half-wave motors are installed on the outer casing, differentiating their phases by 120/n degrees from each other. Or, respective armatures of the n sets of half-wave motors are disposed at the same phase, whereas the phase of adjacent rotors are differentiated by an amount of 120/n degrees. The full-wave motor consisting of n sets of half-wave motors can generate a large and flat output torque corresponding to a summation of half-wave motor output torques whose phases are successively differentiated by an amount of 120/n degrees.

Next, referring to FIGS. 13 to 15, a three-phase full-wave reluctance type motor in accordance with the fourth embodiment of the present invention will be explained.

Figure 13:
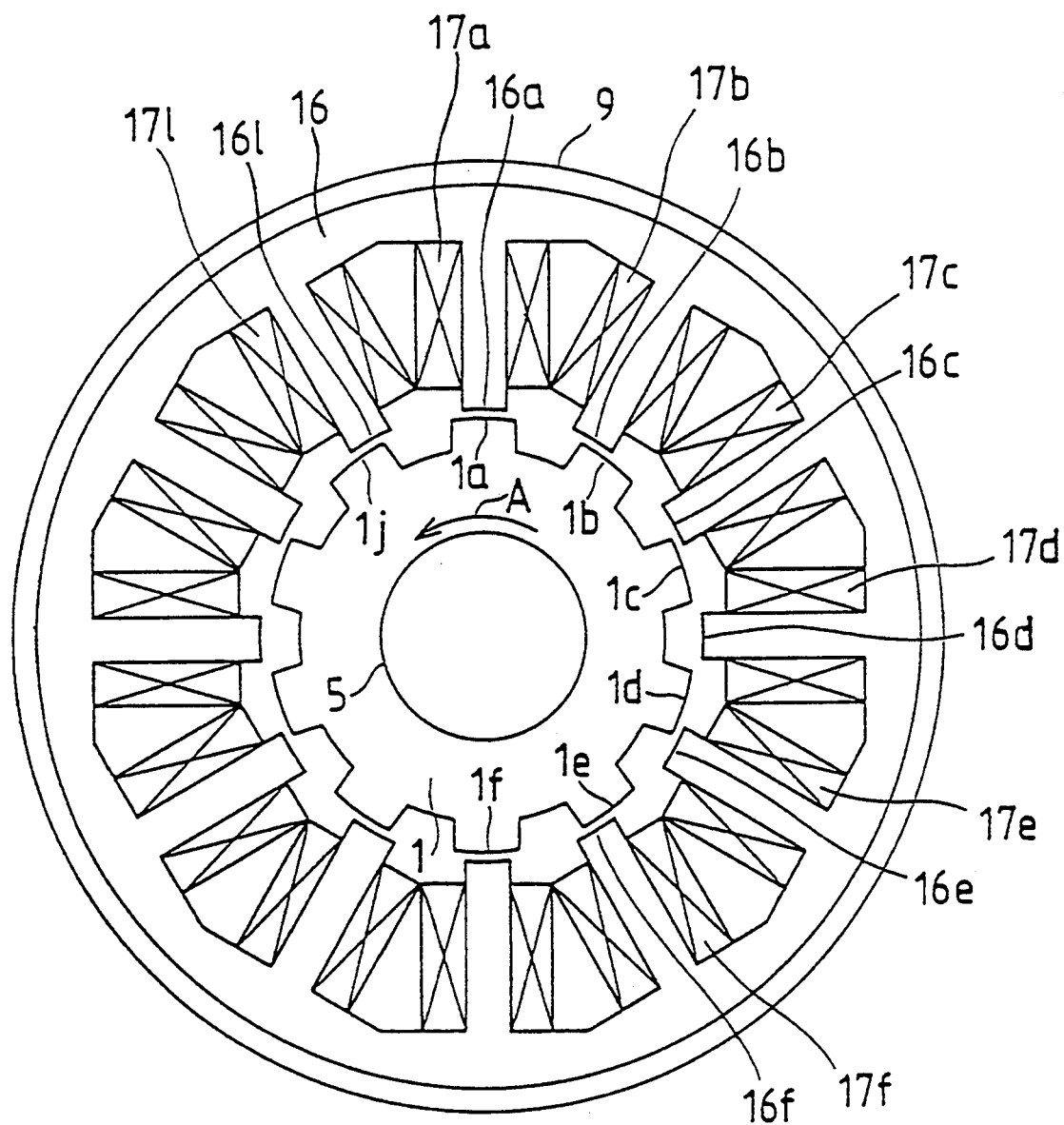
FIG. 13 is a schematic side view showing a rotor and an armature of a three-phase full-wave reluctance type motor in accordance with a fourth embodiment of the present invention.
Figure 14:
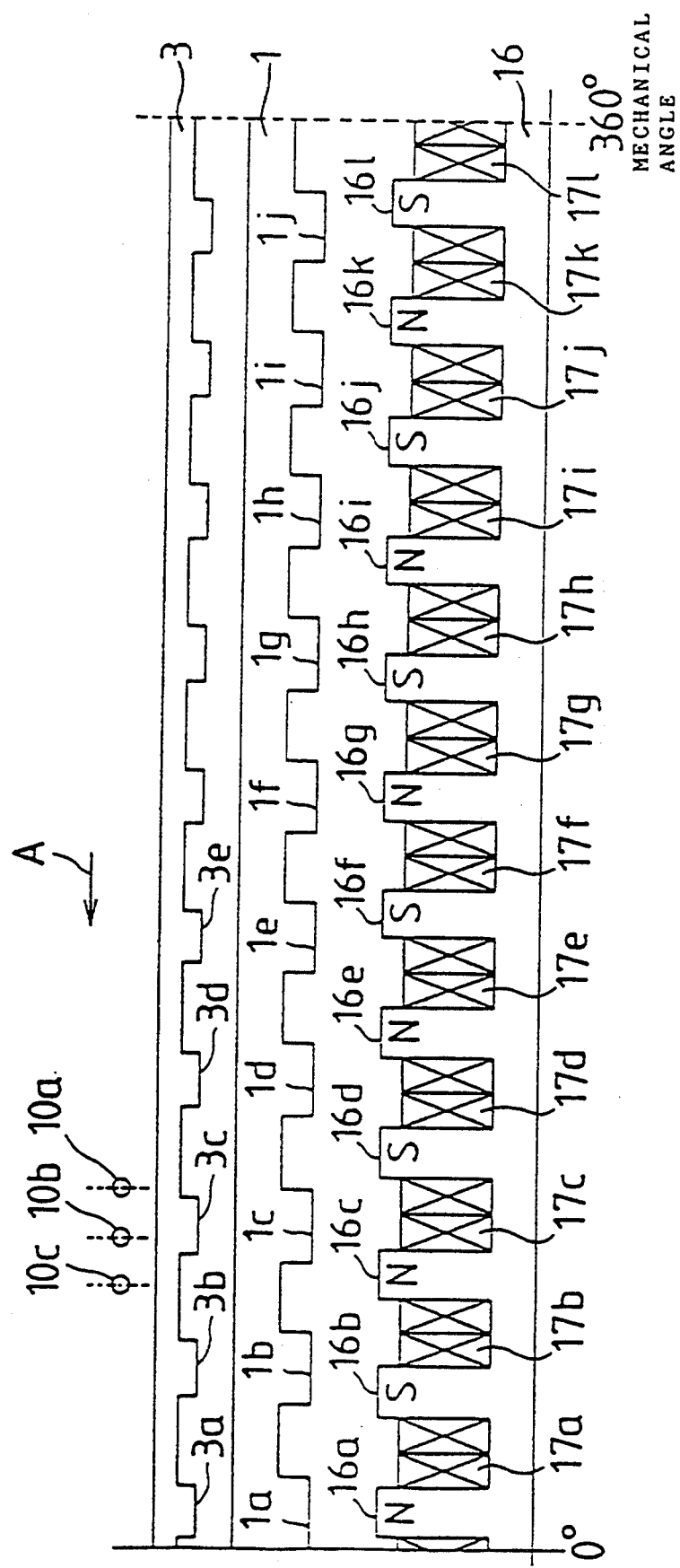
FIG. 14 is a schematic development showing the rotor and the armature of FIG. 13.

As shown in FIGS. 13 and 14, the rotational shaft 5 is supported rotatably on the bearings provided on both side plates of the outer casing 9. A magnetic rotor 1 is fixed on the rotational shaft 5. Ten salient-poles 1a~1j each having a 180-degree width, are formed on the rotor 1 at equal angular intervals. A fixed armature 16 inserted in the outer casing 9 is equipped with 12 equidistantly positioned magnetic poles 16a~16l, each having a 120-degree width and associated with exciting coils 17a~17l.

The magnetic poles 16a~16l are magnetized by the exciting coils 17a~17l to polarities shown in FIG. 14. The exciting coils 17a and 17g are connected in series or in parallel with each other to constitute an exciting coil pair 32a. In a similar manner, the exciting coils 17b and 17h constitute an exciting coil pair 32b; the exciting coils 17c and 17i constitute an exciting coil pair 32c; the exciting coils 17d and 17j constitute an exciting coil pair 32d. Furthermore, the exciting coils 17e and 17k constitute an exciting coil pair 32e, and the exciting coils 17f and 17l constitute an exciting coil pair 32f.

In the following description, the exciting coil pairs 32a, 32c and 32e are referred to as No. 1, No. 2 and No.3phase exciting coil pairs, respectively, whereas the exciting coil pairs 32d, 32b and 32f are referred to as $\overline{\text{No. 1}}$, $\overline{\text{No. 2}}$, and $\overline{\text{No. 3}}$ phase exciting coil pairs, respectively.

Position detecting coils 10a~10c are fixed to the armature 16 at the positions shown in FIG. 14 facing the salient-poles 1a~1j. An electric circuit constituting the position detecting device together with the coils 10a~10c has the same constitution as the one shown in FIG. 3, and generates the position detecting signals 36~38 and 43~45 shown in FIG. 5.

In the following description, the position detecting signals 36, 37 and 38 are referred to as No.1,No. 2 and No. 3phase position detecting signals, respectively, whereas the position detecting signals 43~45 are referred to as $\overline{\text{No. 1}}$, $\overline{\text{No. 2}}$ and $\overline{\text{No. 3}}$ phase position detecting signals, respectively.

Figure 15:
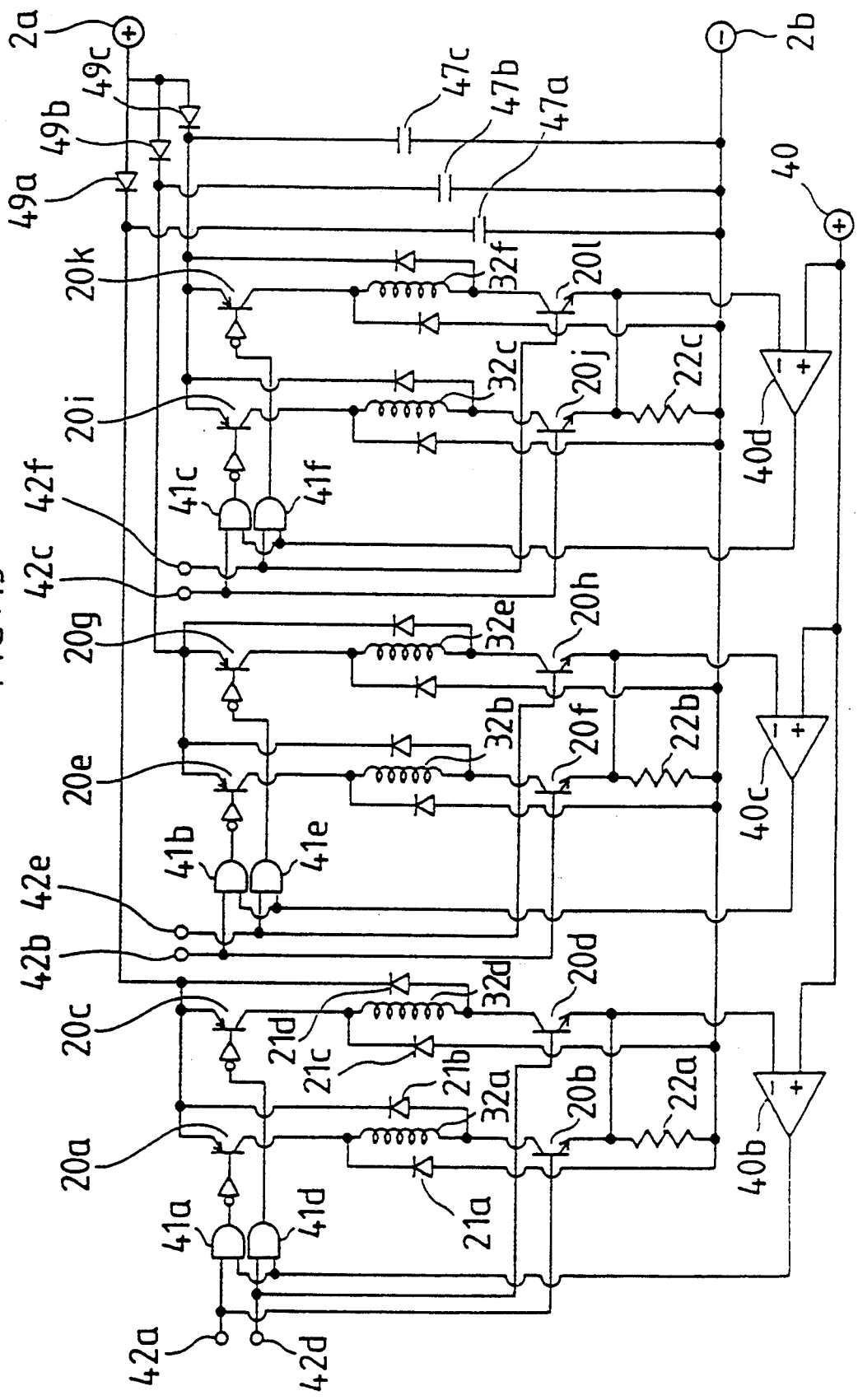
FIG. 15 is a circuit diagram showing a current supply control circuit used in the fourth embodiment.

The position detecting signals 36~38 are applied to the input terminals 42a, 42b and 42c of the current supply control circuit shown in FIG. 15, whereas position detecting signals 43~45 are applied to the input terminals 42d, 42e and 42f of the current supply control circuit. And, the exciting coil pairs 32a, 32c and 32e are respectively activated in response to H-level position detecting signals 36a, 36b, - - -, 37a, 37b, - - - and 38a, 38b, - - -, whereas exciting coil pairs 32b, 32d and 32f are activated in response to H-level position detecting signals 45a, 45b, - - -, 43a, 43b, - - - and 44a, 44b, - - -, whereby the rotor 1 is caused to rotate in a direction of an arrow A.

More particularly, when the H-level position detecting signal 36a is applied to an input terminal of the current supply control circuit to turn on the transistors 20a and 20b, the exciting coil pair 32a will be energized through a back-flow preventing diode 49a connected to the DC electric power source in forward direction. After that, if the H-level signal 36a is extinguished, the transistors 20a and 20b will be turned off.

In this case, the return of the magnetic energy stored in the exciting coil pair 32a to the DC electric power source through the diodes 21a and 21b will be prevented by diode 49a, whereby capacitor 47a is charged by the discharge current derived from the magnetic energy, and thus the discharge current is extinguished quickly. As a result, a generation of the counter torque is prevented. For the capacitor 47a, a small-capacitance capacitor such as one capable of extinguishing the above discharge current within a time period of 60 degrees is used. However, if the capacitance of the capacitor is too small, the charging voltage of the capacitor will exceed the withstand voltages of the transistors 20a~20d.

After the rotor 1 has rotated 60 degrees, an H-level position detecting signal 43a is applied to the input terminal 42d of the current supply control circuit. This causes the transistors 20c and 20d to be turned on to activate the exciting coil pair 32d. At this moment, the voltage of the DC electric power source and the charged voltage of the capacitor 47a are applied to the exciting coil pair 32d to cause the exciting current to builds up rapidly as shown by a curve 32-1 of FIG. 6. An advanced-phase angle is set to approximately 20 degrees.

After that, the exciting current decreases along a curve 32-2. The H-level signal 43a is extinguished at a time point indicated by a broken line 24h. By virtue of magnetic energy stored in the exciting coil pair 32d, the capacitor 47a is again charged up to a high voltage through the diodes 21c, 21d. This causes the exciting current 32-3 to decrease rapidly to prevent the generation of the counter torque.

Subsequently, when the H-level position detecting signal 36b is applied to the input terminal 42a, the exciting current flowing in the exciting coil pair 32a builds up promptly. At the time point when current supply is started and during the initial stage of the current supply period, the fall of the exciting current is prevented against an electromotive force occurring due to an increase of magnetic flux passing through the magnetic poles, thereby preventing the fall of the motor output torque.

In the case where the current supply is initiated at the time point when the salient-poles enter the magnetic poles without an advanced-phase current supply, if the exciting coil pair 32d is deactivated, the capacitor 47a is rapidly charged with the magnetic energy stored in this exciting coil pair, so that the magnetic energy is extinguished before the rotor 1 rotates 60 degrees from the point when the exciting coil pair 32d is deactivated even when the motor is rotating at a high speed.

Furthermore, when the current supply to the exciting coil 32a is initiated, the exciting current increases steeply due to the charged voltage of the capacitor 47a, and thus, if the copper loss of the exciting coil is neglected, it can be concluded that the exciting current reaches a predetermined level before the rotor 1 rotates 60 degrees from the starting point of the current supply.

After that, a voltage value obtained by subtracting a voltage drop occurring due to the resistance of the exciting coil from the voltage of the DC electric power source balances with a reverse electromotive force occurring due to an increased inductance derived from an increase in the area between the salient-poles and the magnetic poles, which are disposed facing each other. As a result, an output corresponding to the reverse electromotive force will be generated.

On the other hand, when the advanced-phase current supply is made, the exciting current can be built up more rapidly in the initial stage of the current supply period, thereby enabling the motor to be driven at a higher speed and with a higher torque. Therefore, it is preferable to set the advanced-phase angle to an adequate value within a range of 0~30 degrees by taking a required rotational speed and a required output torque of the motor into consideration. Moreover, a time period required for processing the stored magnetic energy through the capacitor 47a can be estimated, since the frequency of a series LC oscillation circuit is inversely proportional to a square root of LC.

In this embodiment, the AND circuits 41a, 41d and the operational amplifier 40b provide the chopper effect as already explained with reference to FIG. 4, corresponding to FIG. 15. Therefore, the exciting current flowing through the exciting coil pair 32a and 32d in accordance with an voltage applied to the standard voltage terminal 40 can be maintained at a predetermined value, thereby also enabling the control the output torque.

Furthermore, in the same fashion as the cases of the exciting coil pair 32a and 32d, when the position detecting signals are applied to the input terminals 42b and 42e of the current supply control circuit, the current supply control to the exciting coil pairs 32b and 32e is carried out by the diode 49b, the capacitor 47b, the AND circuits 41b, 41e, the transistors 20e, 20f, the resistance 22b, the operational amplifier 40c etc. Also, when the position detecting signals are applied to the input terminals 42c and 42f of the current supply control circuit, the current supply to the exciting coil pairs 32c, 32f is controlled by the diode 49c, the capacitor 47c, the AND circuits 41c, 41f, the transistors 20i, 20j, the resistance 22c, the operational amplifier 40d etc.

In the case of the full-wave reluctance type motor according to the present invention, not only can the major disadvantage of the reluctance type motor, such as the poor drivability in a high speed region can be removed but also the ripple of the output torque can be suppressed, without sacrificing its advantage such as the availability of a large output torque. This embodiment differs from the current supply control circuit of FIG. 4 in that the capacitors 47a~47c and the diodes 49a~49c are connected in series, but the capacitors function in the same manner.

The above embodiment can be modified variously.

Figure 16:
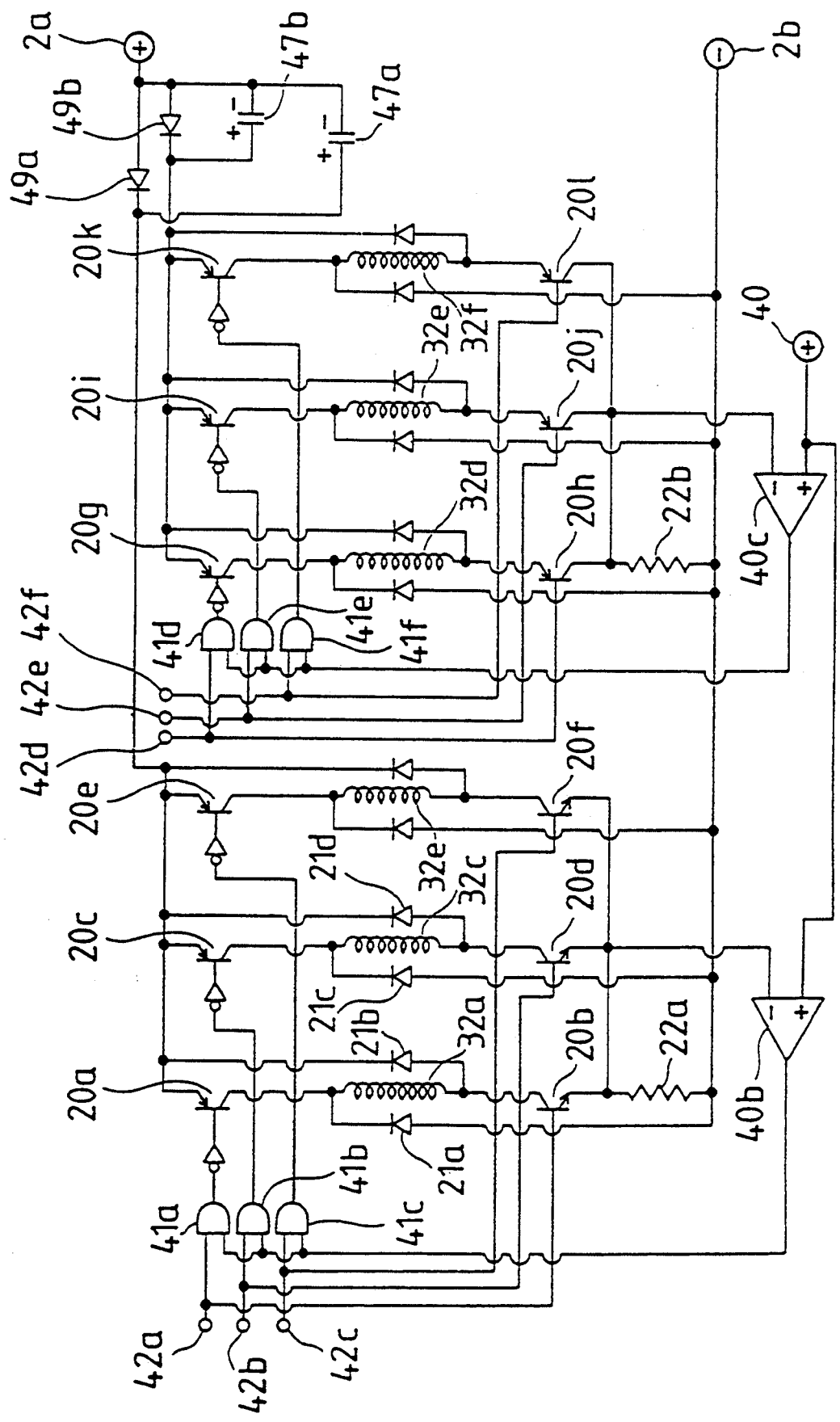
FIG. 16 is a circuit diagram showing a modified example of the circuit shown in FIG. 15.

For example, the current supply control circuit of FIG. 15 can be replaced by a more simple current supply control circuit shown in FIG. 16. Furthermore, the above embodiment sets the width of current supply sections for the exciting coil pairs to 120 degrees, but this width for the of current supply sections can be changed to 90 degrees or 150 degrees.

Where the current supply is to be made by a width of 150 degrees, in order to obtain a position detecting signal of a 150-degree width, the protruding portions to be formed on the peripheral portion of the conductor 3 (FIG. 14), which is rotatable synchronously with the rotor 1, are supposed to have a 150-degree width; the coils 10a~10c are disposed to face the protruding portions; and the other three coils are also disposed to face the protruding portions with their phases differentiated by 60 degrees from those of the coils 10a~10c, respectively.

In the position detecting device shown in FIG. 9, No. 1-phase, No. 2-phase and No. 3-phase position detecting signals 50, 51 and 53 (FIG. 10), respectively relating to coils 10a~10c are generated, whereas $\overline{\text{No. 1}}$-phase, $\overline{\text{No. 2}}$-phase and $\overline{\text{No. 3}}$-phase position detecting signals 53~55 (FIG. 10), respectively relating to the other three coils are also generated. And, position detecting signals 50~55 are supplied to the input terminals 42a~42f of the current supply control circuit shown in FIG. 15.

In the motor of the above modified embodiment, for example, if the H-level position detecting signal 53b is extinguished to turn off the transistors 20c and 20d, the current derived from the magnetic energy stored in the exciting coil pair 32d causes the capacitor 47a to be changed to a high voltage through diodes 21c and 21d.

A capacitance of the capacitor 47a is selected so that the magnetic energy current disappears before the rotor 1 rotates 30 degrees from the point at which the H-level signal is extinguished. Then, when the rotor 1 rotates 30 degrees, and the H-level position detecting signal 50a is applied, the transistors 20a and 20a are turned on to initiate the current supply to the exciting coil pair 32a. This current supply starts at 30 degrees before the position of the rotor at which the salient-poles enter the magnetic poles. That is, an advanced-phase angle shown by being shaded in FIG. 10 is 30 degrees. Since the magnetic poles are not facing the salient-poles at the beginning of the current supply period, and the inductance is remarkably small, the exciting current flowing through the exciting coil pair 32a builds up steeply as shown by a curve 27a in FIG. 6.

After that, when the rotor 1 further rotates 30 degrees to reach the time point 24e at which the salient-poles begin to enter the magnetic poles, the inductance starts to increase. However, the exciting current decreases gradually as shown by the curve 27b by virtue of the electrostatic energy. When the value of the exciting current 27a is excessively high in the initial phase of the current supply period, the electrostatic energy for suppressing the fall of the exciting current becomes small in an intermediate part of the current supply period.

In this modified embodiment, in order to resolve such a problem, the chopper control function of the operational amplifier 40b and the AND circuits 41a, and 41d are utilized so an adequate value shown by a broken line H-1 even during the advanced-phase current supply period to reduce the consumption of the electrostatic energy.

Subsequently, the exciting current is extinguished rapidly before the rotor 1 rotates 30 degrees from the time point 24f at which the current supply is stopped, to prevent a generation of the counter torque. In FIG. 6, an arrow 23g denotes a 150-degree current supply angle; an arrow 23h denotes a torque generating section of 150 degrees, and an arrow 23i denotes a positive torque generating section.

Similarly, the current supply control to the exciting coil pairs 32b and 32e is carried out by the diode 49b and the capacitor 47b, whereas the current supply control to the exciting coil pairs 32c, 32f is carried out by the diode 49c and the capacitor 47c.

In FIG. 11, curves 31a and 31a denote torques generated by the exciting currents corresponding to the position detecting signals 50a and 53a. In the same way, in response to the application of position detecting signals 51a, and 54a, torques expressed by the curves 31b and 31b are generated, whereas in response to the application of position detecting signals 52a and 55a, torques expressed by the curves 31c and 32c are generated. Then, the motor generates an output torque corresponding to a summation of above-described torque curves. In this manner, the output torque can be increased where the current supply section is set to 150 degrees according to the modified embodiment.

Figure 17:
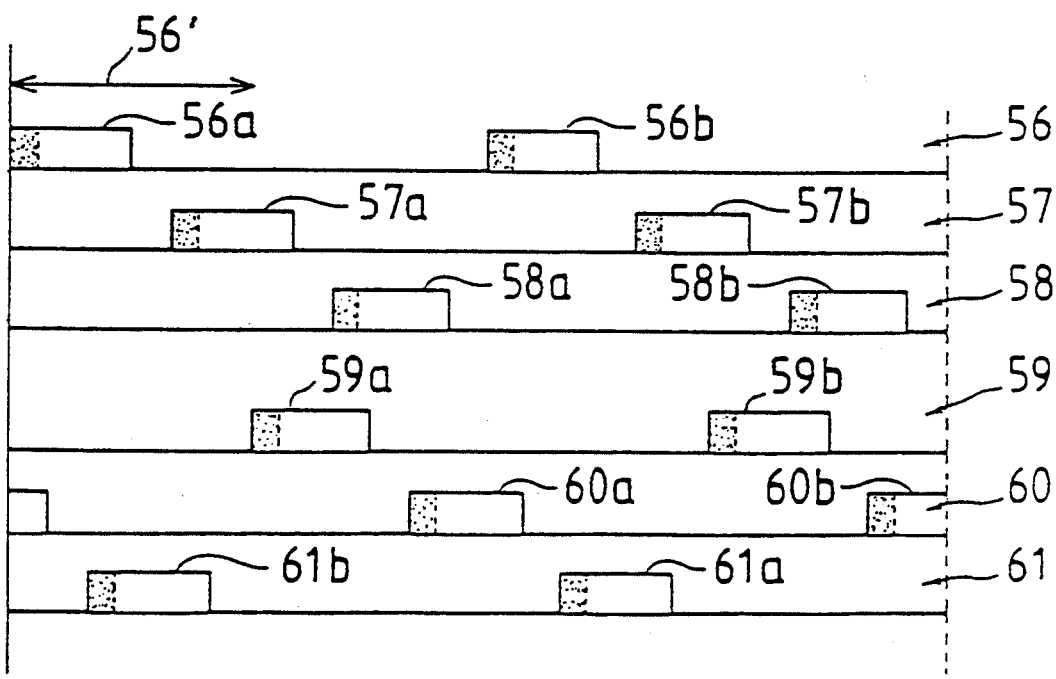
FIG. 17 is a timing chart showing position detecting signals in accordance with the modified example of the fourth embodiment.

On the other hand, where the exciting coil pair is applied with the exciting current of a 90-degree width, the protruding portions, each having a 90-degree width, are formed on the conductive disk plate 3 shown in FIG. 14. In this case, FIG. 17 shows No. 1-phase position detecting signal 56, No. 2-phase position detecting signal 57, and No. 3-phase position detecting signal 58 together with a No. 1-phase position detecting signal 59, No. 2-phase position detecting signal 60 and a No. 3-phase position detecting signal 61. In FIG. 17, an arrow 56' denotes a 180-degree width, and suffixes a and b denote H-level position detecting signals.

The signals 56~61 are supplied to the input terminals 42a~42f of the current supply control circuit shown in FIG. 16, respectively. When each of the position detecting signals 56~58 turn to H-levels, the corresponding No. 1- to No. 3-phase exciting coil pairs 32a, 32c and 32e are activated by the current supply of a 90-degree width, respectively. Due to the 90-degree current supply width, successively inputted H-level signals 56a, 57a and 58a have a 30-degree time gap therebetween. This, coupled with the functions of diode 49a and the capacitor 47a, causes the exciting current and its trailing-edge to become steep, thereby enabling the torque reduction and the removal of counter torque. Furthermore, the chopper function is effected by the operational amplifier 40b and the AND circuits 41a, 41b and 41c.

In the same manner, when each of the position detecting signals 59~61 turn to H-levels, the No. 1- to No. 3-phase exciting coil pairs 32d, 32e and 32f are activated by the current supply. Due to the 90-degree current supply width, successively inputted H-level signals have a 30-degee time gap therebetween. This, coupled with the function of the diode 49b and the capacitor 47b, causes the building-up of the exciting current and its trailing-edge become a steep. Furthermore, the chopper function is effected by the operational amplifier 40c etc.

Curves 26, 26a and 26b in FIG. 6 denote an exciting current flowing through the exciting current pair 32a, and an advanced-phase angle being shaded is 20 degrees. The exciting current builds up sharply as shown by the curve 26. Then the exciting current varies as expressed by the curve 26a after the time point 24c at which the salient poles begin to enter the magnetic poles. Further, after the time point 24d at which the current supply is stopped, the magnetic energy stored in the exciting coil pair 32a will generate a current. But, this discharge current decreases promptly as shown by the curve 26b. Furthermore, even if the trailing-off time of the curve 26b is increased, the counter torque will not be generated. Thus, according to this embodiment, the motor can be driven at a higher speed than that in the fourth embodiment. In FIG. 6, an arrow 23e denotes a 90-degree width, an arrow 23f denotes a current supply width contributing the torque generation and a broken line H denotes a current value maintained by the chopper control.

In FIG. 11, curves 29a, 29b, 30a, and 30b show torques generated by the exciting current to flow when position detecting signals 56a, 57a, 59a and 60a are inputted, whereby the motor generates an output torque corresponding to the summation of these curves. According to this modified embodiment, a three-phase full-wave reluctance type motor having a good driving efficiency and capable of being driven at a high speed can be provided. Further, the second embodiment can be modified in the same manner as this modified embodiment.

Hereinafter, with reference to FIGS. 18~21, a two-phase full-wave reluctance type motor in accordance with the fifth embodiment of the present invention will be explained.

In FIG. 18, the armature 16 comprises the magnetic core 16' made of a laminated steel sheet and equidistantly formed eight magnetic poles 16a, 16b, - - -, which are also made of a laminated steel sheet, and the armature 16 is fixed to the outer casing of the motor. The ends of magnetic poles 16a, 6b, - - - are formed to have a 120-degree width, respectively, and are provided with the exciting coils 17a, 17b, - - - -. The width of each magnetic pole is made relatively narrow, such as 120 degrees, to increase the space for installing the exciting coils. The rotor 1 comprises six salient-poles 1a, 1b, - - -, which are uniformly spaced with each other, facing the magnetic poles 16a, 16b, - - - through air gaps of approximately 0.1~0.2 mm.

When the exciting coils 17b and 17f are activated, the salient-poles 1b and 1e are magnitically attracted to cause the rotor 1 to rotate in a direction of an arrow A. When the rotor 1 rotates 90 degrees, the exciting coils 17b and 17f are deactivated, whereas the exciting coils 17c and 17g are activated to magnetically attract the salient-poles 1c and 1f, thereby generating the torque. The magnetic poles 16b and 16c are magnetized respectively for N-polarity, whereas magnetic poles 16f and 16g are magnetized respectively for S-polarity. Thus, the occurrence of a counter torque due to a leaking magnetic flux can be reduced.

At a subsequent 90-degree rotation, the magnetic poles 16d and 16h are magnetized to be the N-pole and S-pole, respectively. Further, every time the rotor 1 rotates 90 degrees, respective magnetic poles are magnetized to the polarities shown in FIG. 18. As a result, the rotor 1 rotates in a direction of the arrow A. Further, the rotor 1 can rotate even if the width of the current supply section exceeds 90 degrees.

Figure 19:
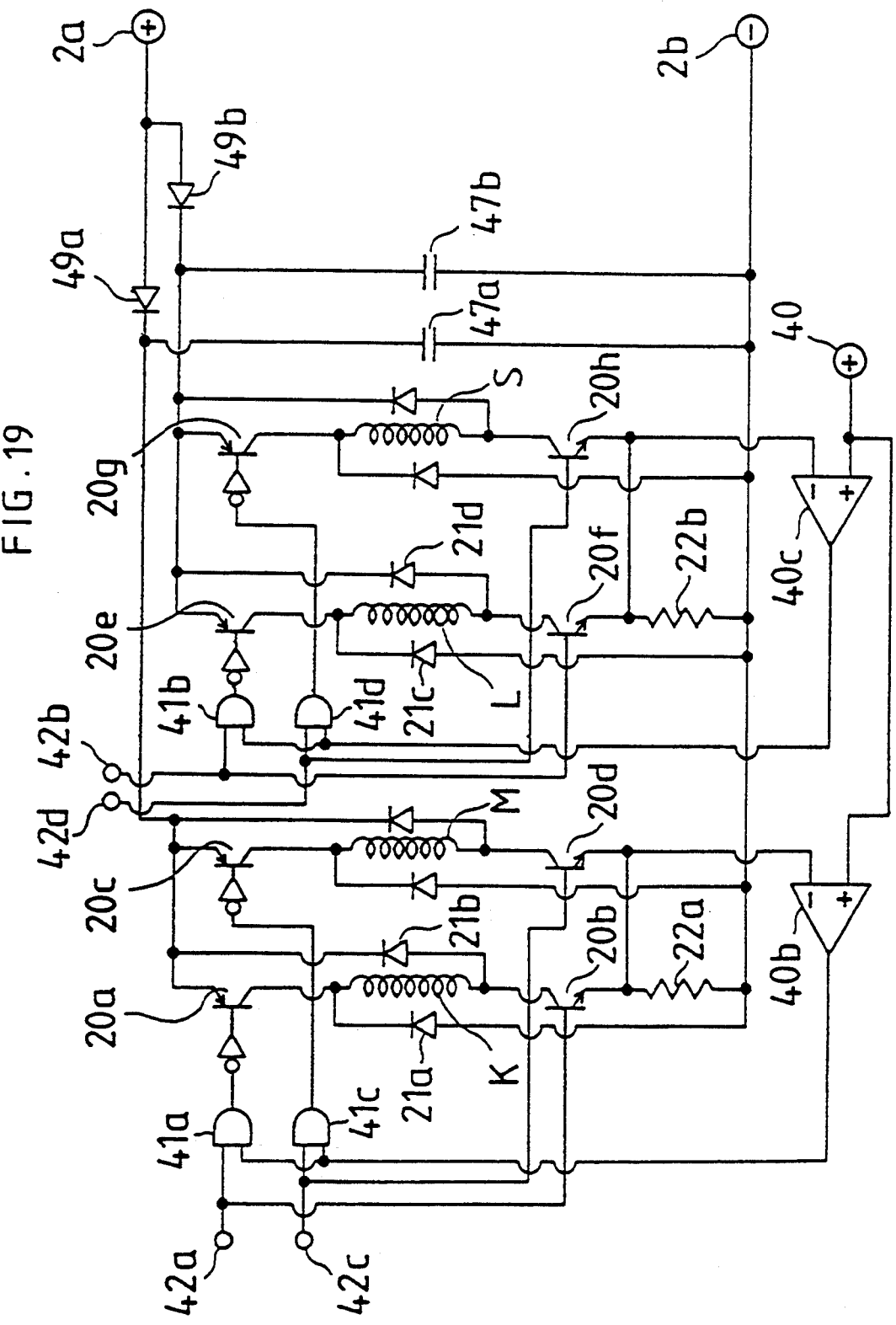
FIG. 19 is a circuit diagram showing a current supply control circuit used in the fifth embodiment.

In FIG. 19, an exciting coil pair K is constituted by connecting two exciting coils 17a and 17e in series or in parallel. Both ends of this exiting coil pair K are connected to the semiconductor switching elements such as transistors 20a and 20b. In the same way, an exciting coil pair M is constituted by connecting two exciting coils 17c and 17g in series or in parallel, and both ends of this exciting coil pair M are connected to the transistors 20c and 20d.

If the H-level position detecting signal is inputted to the input terminal 42a of the supply current control circuit, the transistors 20a, 20b are turned on to activate the exciting coil pair K, whereas, if the H-level position detecting signal is inputted to the input terminal 42c of the supply current control circuit, the transistors 20c and 20d are turned on to activate the exciting coil pair M.

The position detecting coils 10d, 10e, $\overline{10d}$, and $\overline{10e}$ shown in FIG. 18 have the same constitutions as the previous coils 10a~10c. The protruding portions 3a, 3b, ..., each having a 150-degree width, are formed on the conductive disk plate 3, which is rotatable synchronously with the rotor 1, facing the position detecting coils 10d, 10e, $\overline{10d}$, and $\overline{10e}$. The coils 10d and 10e are mutually spaced by 90 degrees, and the coils $\overline{10d}$, $\overline{10e}$ are spaced by 180 degrees from the coils 10d and 10e respectively.

FIG. 20 shows an electric circuit constituting a position detecting device cooperatively with above position detecting coils. In the same way as the circuit shown in FIG. 9, this electric circuit comprises the oscillator 10, the resistors 15a, 15b, the operational amplifier 13 etc., and comprises a section including coil 10d. Sections 8a~8c include coils 10e, $\overline{10d}$ and $\overline{10e}$ respectively, and are of the same constitution as the section including coil 10d.

Figure 21:
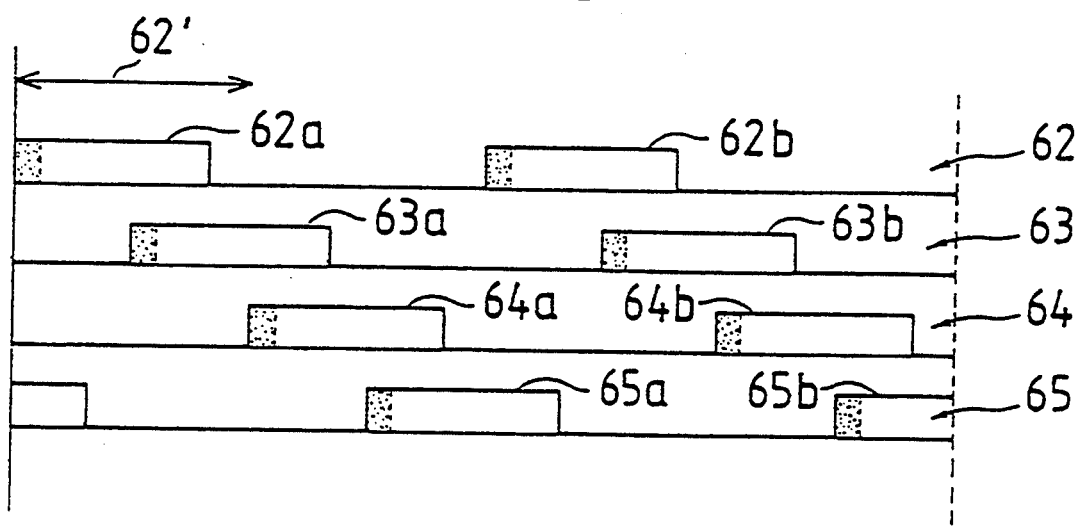
FIG. 21 is a timing chart showing position detecting signals of the position detecting device in the fifth embodiment.

The circuit section including the coil 10d and other circuit sections 8a~8c are constituted in such a manner that No. 1-phase position detecting signal 62, No. 2-phase position detecting signal 63, $\overline{No.\ 1}$-phase position detecting signal 64 and $\overline{No.\ 2}$-phase position detecting signal 65 (FIG. 21), respectively having the same width rectangular-waveform as the protruding portions 3a, 3b, . . . of the disk plate 3, are outputted to the input terminals 42a~42d of the supply current control circuit through the output terminals, respectively. Respective phase position detecting signals have a 150-degree width and are offset 90 degrees with each other. In FIG. 21, an arrow 62' denotes a 180-degree width and a shaded portion denotes an advanced-phase angle.

When the respective phase position detecting signals are inputted to the current supply control circuit, the corresponding transistors in the current supply control circuit are turned on or off to cause a $\overline{No.\ 1}$-phase exciting coil pair K, a $\overline{No.\ 2}$-phase exciting coil pair L, a No. 1-phase exciting coil pair M and a No. 2-phase exciting coil pair S to be successively activated by the current supply of a 150-degree width. The torque generation condition and its characteristic in this embodiment are the same as the previous embodiment. In the same manner as the above embodiment, the chopper control of exciting current is carried out by the operational amplifier 40b, the transistor 22a and AND circuits 41a and 41c or by the operational amplifier 40c, the transistor 22a and AND circuits 41b and 41d.

Then, for example, the exciting current flowing through the exciting coil pair K in response to the position detecting signal 62a builds up rapidly as shown by the curve 27a in FIG. 6 by the functions of the diode 49a and the capacitor 47a. Then this exciting current decreases gradually as shown by the curve 27b and, in turn, decreases rapidly as shown by the curve 27c. The diodes 49b and capacitor 47b effect the same functions.

This embodiment can be modified variously.

For example, this embodiment is explained by taking a 150-degree width current supply section, but this width can be varied in a range of 90~150 degrees. In the case where the current supply width is set to 90 degrees, the motor can be driven at a high speed of 100 thousand rpm with 1 kw, though the motor output torque is decreased. Where the current supply width is set to 150 degrees, however, the motor output torque can be increased, though the motor speed is decreased to a half of the speed obtained in the case of a 90-degree width.

Figure 22:
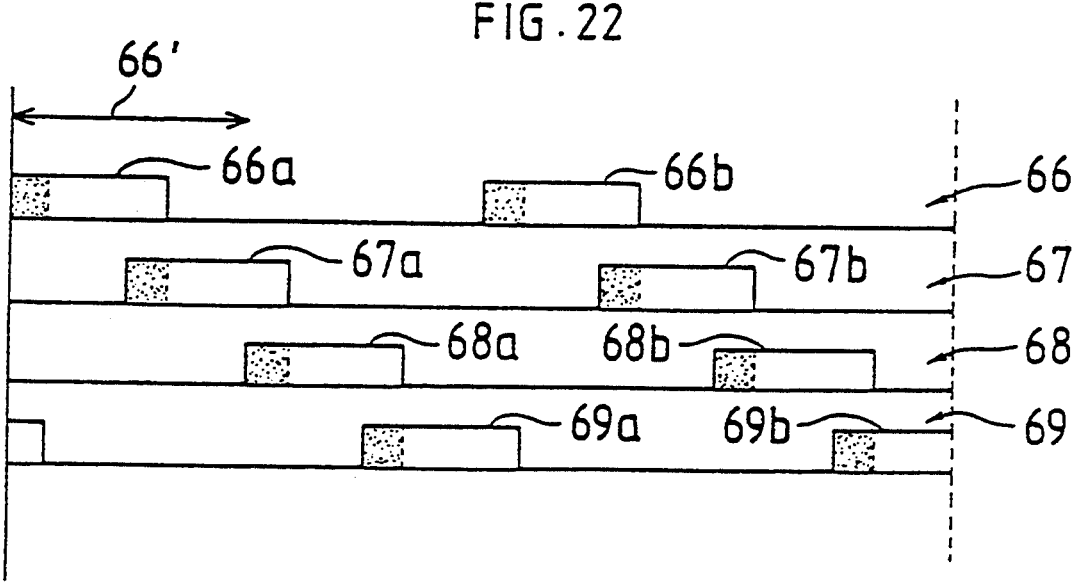
FIG. 22 is a timing chart showing position detecting signals in accordance with a modified example of the fifth embodiment.

In order to obtain a 120-degree width position detecting signal to supply current at a 120-degree width, this can be accomplished by changing the width of the protruding portions 3a, 3b, - - - to 120 degrees. Curves 66~69 in FIG. 22 show a $\overline{No.\ 1}$-phase position detecting signal, a $\overline{No.\ 2}$-phase position detecting signal a No.1-phase position detecting signal, and a No.2-phase position detecting signal, which are respectively related to the coils 10d, 10e, $\overline{10d}$, and $\overline{10e}$ and supplied to the input terminals 42a~42d of the current supply control circuit shown in FIG. 19. These position detecting signals have a 90-degree phase difference with each other. In the drawing, suffix characters, a and b denote H-level conditions, an arrow 66' denotes a 180-degree section and a shaded portion denotes an advanced-phase angle. This advanced-phase angle can be varied in a range of 0~30 degrees.

Furthermore, though the fifth embodiment provides 8 magnetic poles and 6 salient-poles, the magnetic pole width shown in FIG. 18 may be changed to 180 degrees, and the salient-pole number may be increased to 10. Or, it is also possible to set the magnetic pole width to 120 degrees and provide 8 n (n: a positive integer) pieces of magnetic poles. In this case, the salient-poles can be increased to as many as necessary. In the case where the number of magnetic poles is increased, the rotational speed of the motor decreases.

Further, if the motor has a larger diameter, the first embodiment can be modified to have 6 n (n: a positive integer) pieces of magnetic pole and the number of salient-poles may be increased by as many as possible to obtain a larger output torque. Still further, the output torque can be increased by forming teeth on the magnetic poles and salient-poles. In this case, the present invention apparatus can enjoy the merit of a torque increase in addition to the high-speed rotation, without incurring problems derived from the teeth.

Next, a two-phase full-wave reluctance type motor in accordance with a sixth embodiment of the present invention will be explained.

Figure 23:
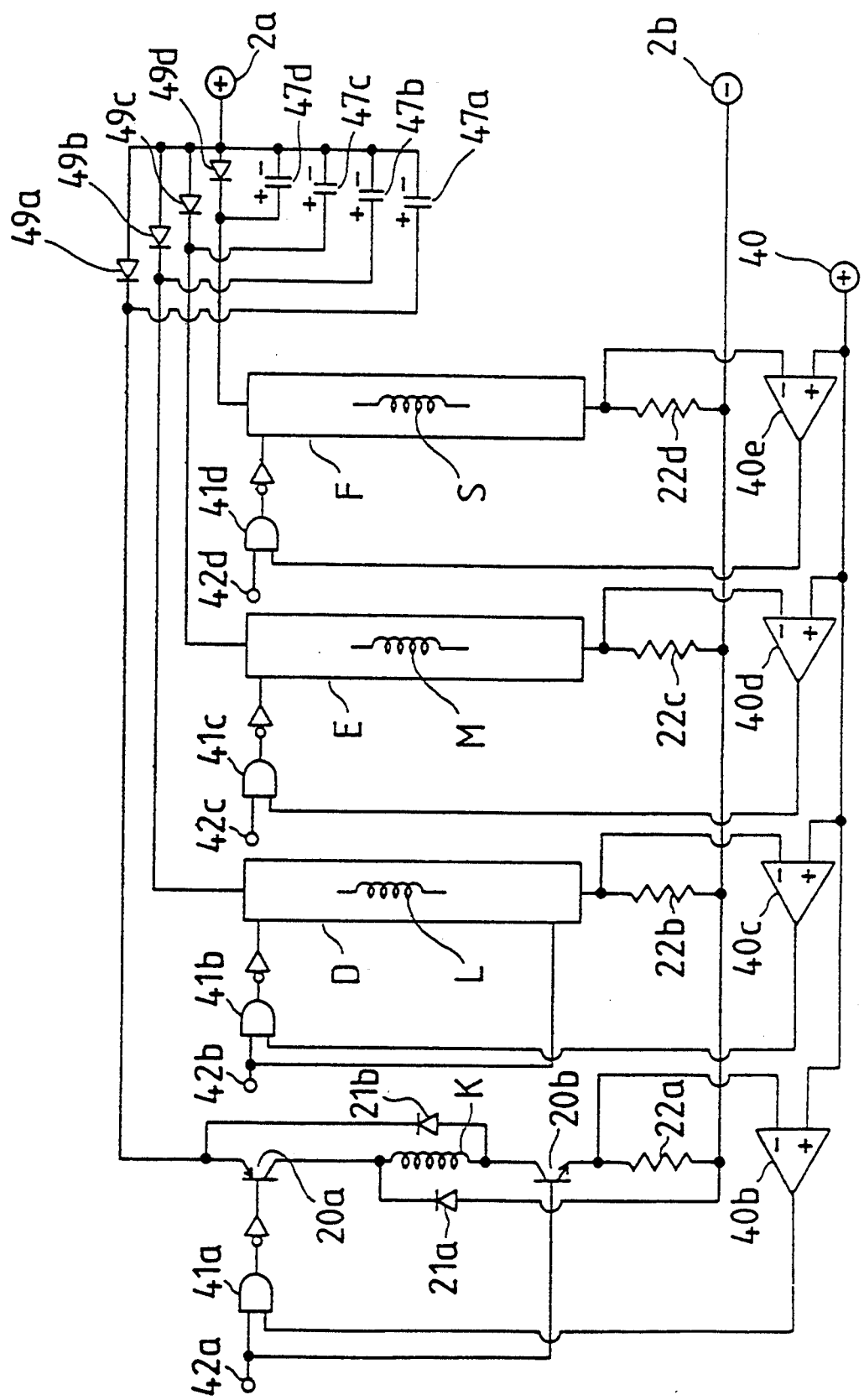
FIG. 23 is a circuit diagram showing a current supply control circuit of a two-phase full-wave reluctance type motor in accordance with a sixth embodiment of the present invention; and, FIG. 24 is a circuit diagram showing a modified example of the current supply control circuit shown in FIG. 23.

This embodiment is characterized in that the current supply control circuit shown in FIG. 23, which consists of four independent circuit sections, controls the current supply to the No.1-phase, the No.2-phase, the $\overline{No.\ 1}$-phase and the $\overline{No.\ 2}$-phase exciting coils. Current is supplied from the DC electric power source to respective phase exciting coils through the diodes 49a~49d and the capacitors 47a~47d. The width of respective phase position detecting signals can be changed in a range of 90~150 degrees. A case where a 150-degree width position detecting signal is used as shown in FIG. 21 will be explained as an example.

When the H-level position detecting signal 62a (FIG. 21) is applied to the input terminal 42a of the current supply control circuit, the transistors 20a and 20b are turned on to activate the No.1 phase exciting coil K. Then, if the current supply is stopped, the discharge current derived from the magnetic energy stored in the exciting coil K is supplied through the diodes 21a and 21b to the capacitor 47a, thereby causing the capacitor to be charged to a high voltage for providing the polarities shown in the drawing. As a result, the magnetic energizing current will be extinguished rapidly.

The charged voltage in the capacitor is maintained until the exciting coil K is again supplied with the exciting current in response to the H-level position detecting signal 62b. Subsequently, when the H-level signal 62b is applied, a large voltage equal to a summation of the charged voltage of the capacitor and the voltage of the DC electric power source will be applied to cause the exciting current to be built up rapidly. Thus, even in the case where the advanced-phase current supply is applied, the reduction rate of the exciting current can be controlled. When the H-level signal 62b is extinguished to deactivate the exciting coil, the capacitor 47a will be charged again, and, accordingly, the discharge current due to the stored magnetic energy will decrease rapidly.

When the No. 2-phase, the $\overline{\text{No. 1}}$-phase and the $\overline{\text{No. 2}}$ phase position detecting signals are supplied to the input terminals 42b~42d of the current supply control circuit, the current supply to the No. 2-phase exciting coil L, the $\overline{\text{No. 1}}$-phase exciting coil M and the $\overline{\text{No. 2}}$-phase exciting coil S can also be controlled in the same manner as in the case of the control of the No. 1-phase exciting coil K by the function of the diodes 49b~49d and the capacitors 47b~47d.

In FIG. 23, blocks D, E and F respectively denote the current supply control circuits for the exciting coils L, M, and S, which are similar to the current supply control circuit of the exciting coil K. The reference numerals 22a~22d denote resistances for detecting the exciting current flowing through the exciting coils K~S. Similarly to the above-described embodiment, the exciting current is chopper-controlled based on a voltage applied to the standard voltage terminal 40 in accordance with the cooperation of the AND circuits 41a~41d and the operational amplifiers 40b~40e.

With the current supply control circuit according to the present invention, a time width from the time point at which the current supply to the exciting coil stops to the time point at which the next current supply begins becomes extremely large compared with that of the above-described embodiment. Thus, even if a 180-degree width position detecting signal is used, there will be enough time for charging the capacitors 47a~47d. Accordingly, by using the position detecting signal having a 180degree width and applying the 30-degree advanced-phase current, not only the generation of the counter torque is prevented, but also a large output torque can be obtained. More particularly, the width of the current supply section can be changed within a range of 90~180 degrees.

The same applies to not only the case of three-phase half-wave current supply shown in FIG. 4 but also to the case of the three-phase full-wave current supply, wherein two sets of the current supply control circuits of FIG. 4 are utilized. Thus, the width of current supply section can be varied within a range of 90~180 degrees. However, where the current supply section is set to 180 degrees, it is necessary to the 30-degree advanced-phase current supply.

Figure 24:
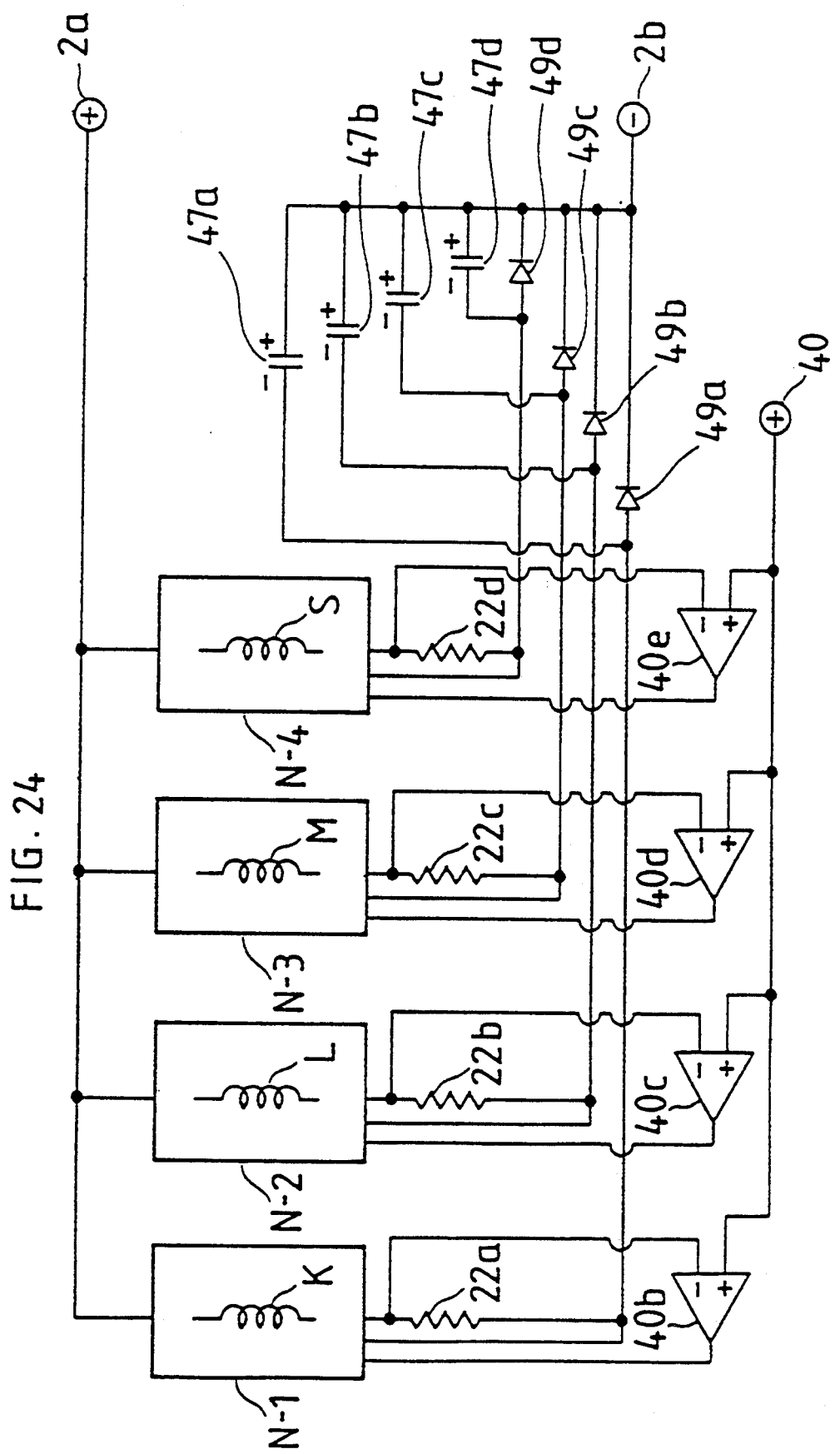

FIG. 24 shows a modified embodiment of the current supply circuit. This current supply control circuit is characterized by the fact that the diodes 49a~49d and the capacitors 47a~47d are provided on the side of a negative terminal 2b of the DC electric power source. In FIG. 24, blocks N-1~N-4 denote the same circuits as the current supply control circuits of the exciting coils K~S shown in FIG. 23. The resistances 22a~22d and the operational amplifiers 40b~40e affect the chopper control function. First ends of resistances 22a~22d are respectively connected to the negative terminal 2b of the DC electric power source through the diodes 49a~49d.

In FIG. 24, for example, if the current supply to the exciting coil L is stopped, the capacitor 47b is charged to a high voltage by the discharge current due to the magnetic energy stored in the exciting coil, causing the rapid extinguishment of the magnetic energy. Then, when the exciting coil L is again supplied with the exciting current, the voltage equal to the summation of the voltage of the DC electric power source and the charged voltage of the capacitor will be applied to the exciting coil L, causing the rapid buildup of the exciting current.

The present invention can further be modified variously without being limited to the above-described embodiments and their modifications. For instance, the above-described various embodiments use coils for the position detecting elements, but these coils can be replaced with other elements such as encoders etc.

What is claimed is:

1. A reluctance type motor driven by a DC electric power source and having a motor main body including a rotor equipped with a plurality of salient-poles and an armature equipped with a plurality of magnetic poles respectively associated with a plurality of exciting coils, said reluctance type motor comprising:

a position detecting device having a number of position detecting elements spaced apart from each other so as to correspond to said plurality of exciting coils, and successively outputting position detecting signals in accordance with a rotational position of the rotor;

a current supply control circuit connected to the DC electric power source for successively activating said exciting coils by supplying respective exciting currents to said exciting coils in response to said position detecting signals;

circuit means having a plurality of capacitors, for promptly discharging a magnetic energy stored in one of said exciting coils into a corresponding one of said plurality of capacitors, as a charged voltage, to charge said one capacitor and rapidly extinguish the magnetic energy stored in said one exciting coil at the moment when the respective exciting current supplied to said one exciting coil is stopped, said circuit means also steeply building up an exciting current supplied to a subsequently activated exciting coil by use of the charged voltage in said one capacitor; and said number of position detecting elements being disposed such that, an interval before any one of said salient-poles begins to enter any one of said magnetic poles, said current supply control circuit is initiated to supply the respective exciting current to the one of said exciting coils associated with said any one of said magnetic poles, and said position detecting device outputs one of said position detecting signals sufficient for continuing the current supply of the respective exciting current to the one exciting coil during a predetermined large electric angle.

2. A reluctance type motor driven by a DC electric power source and having a motor main body including a rotor equipped with a plurality of salient-poles and an armature equipped with a plurality of magnetic poles respectively associated with a plurality of exciting coils, said reluctance type motor comprising:

a position detecting device having a number of position detecting elements spaced apart from each other so as to correspond to said plurality of exciting coils, and successively outputting a first group of a plurality of position detecting signals and also outputting a second group of said plurality of position detecting signals respectively having opposite phases with respect to said first group of position detecting signals, in accordance with a rotational position of said rotor;

a current supply control circuit being connected to the DC electric power source, successively activating a first group of said plurality of exciting coils in response to said first group of position detecting signals and also successively activating a second group of said plurality of exciting coils in response to said second group of position detecting signals, by supplying respective exciting currents to said plurality of exciting coils;

circuit means, having a plurality of capacitors, for promptly discharging a magnetic energy stored in one of said plurality of exciting coils into a corresponding one of said plurality of capacitors, as a charged voltage, so as to charge said corresponding one capacitor and to rapidly extinguish the magnetic energy stored in said one exciting coil at the moment when the respective exciting current supplied to said one exciting coil is stopped, said circuit means also steeply building up the respective exciting current supplied to a subsequently activated exciting coil by use of the charged voltage in said corresponding one capacitor; and, said position detecting elements being disposed in such a manner that, an interval before any one of said salient-poles begins to enter any one of said magnetic poles, the current supply control circuit is initiated to supply the exciting current respectively corresponding to the exciting coil associated with said any one of said magnetic poles, and said position detecting device outputs one of said position detecting signals sufficient for continuing the current supply to the associated exciting coil during a predetermined large electric angle.

3. The reluctance type motor in accordance with claim 1 or 2, wherein a pair of corresponding magnetic poles of said plurality of magnetic poles are disposed facing each other in a diametric direction of the motor main body, and exciting coils respectively associated with said magnetic poles are activated simultaneously by said current supply control circuit so as to have the same phase.

4. The reluctance type motor in accordance with claim 1 or 2 wherein:
said motor main body comprises an outer casing having an inner surface;
said rotor is rotatably supported by said outer casing; and
said armature is fixed on the inner surface of the outer casing.

5. The reluctance type motor in accordance with claim 1 or 2, in which said rotor has an outer surface, and each of said plurality of salient-poles is formed on an outer surface of the rotor so as to be uniformly spaced with each other in a circumferential direction of the rotor and also to have the same circumferential width as each other.

6. The reluctance type motor in accordance with claim 1 or 2, wherein:

said armature has an inner surface, and each of said plurality of magnetic poles is formed on said inner surface of the armature by being spaced uniformly with each other in a circumferential direction of the armature and having the same circumferential width as each other, as well as being disposed facing said plurality of salient-poles over slight gaps.

7. A reluctance type motor in accordance with claim 1 or 2, wherein:
said current supply control circuit comprises a plurality of switching elements respectively interposed between said DC electric power source and a corresponding one of said exciting coils so that the exciting coils can be successively activated by alternately turning on and off said corresponding switching elements;
said circuit means includes diodes, each diode inversely connected to corresponding said switching elements, and back-flow preventing diodes respectively connected in a forward direction with respect to said DC electric power source; and
said capacitors, respectively interposed between respective said inversely connected diodes and back-flow preventing diodes, are successively charged through said inversely connected diodes.

8. The reluctance type motor in accordance with claim 1 or 2, comprising a chopper circuit stopping the corresponding current supplies to each of said exciting coils when said respective exciting current flowing through said respective exciting coil exceeds an upper limit, as well as for resuming the corresponding current supply when said respective exciting current decreases below a lower limit.

9. A three-phase half-wave type reluctance type motor driven by a DC electric power source, said reluctance type motor comprising:
an outer casing having an inner surface;
a rotor having an outer surface formed with a plurality of salient-poles having equal circumferential widths and equally spaced with each other in a circumferential direction, the rotor rotatably supported on the outer casing;
an armature having an inner surface formed with 6 n (n: a positive integer) pieces of magnetic pole respectively having circumferential widths of one of a 120-and a 180-degree electric angle and equally spaced with each other in the circumferential direction to face said plurality of salient-poles over slight gaps, and first, second and third phase exciting coils respectively associated with said magnetic poles, said armature being fixed on the inner surface of the outer casing;
a position detecting device, having a number of position detecting elements spaced apart from each other so as to correspond to said exciting coils, successively outputting a first phase position detecting signal having a rectangular waveform generating a predetermined signal level of a 120~180-degree width at regular intervals of a 360-degree electric angle, a second phase position detecting signal having the same rectangular waveform but delayed by an electric angle of 120 degrees with respect to the first phase position detecting signal and a third phase position detecting signal having the same rectangular waveform but delayed by an electric angle of 120 degrees with respect to the second phase position detecting signal, in accordance with a rotational position of said rotor;

a current supply control circuit including a plurality of switching elements each end of each phase exciting coil serially connected to a respective one of said plurality of switching elements, each of said plurality of switching elements interposed between the DC electric power source and a corresponding one of said first, second and third phase exciting coils, alternately activating and deactivating said first, second and third phase exciting coils by alternately turning on and off said corresponding serially connected switching elements in response to said first, second and third phase position detecting signals, to control exciting currents flowing through respective said first, second and third phase exciting coils, each switching element and corresponding serially connected exciting coil forming a joint unit;

circuit means including diodes respectively connected inversely to said joint units, first, second, and third back-flow preventing diodes respectively connected in a forward direction with respect to the DC electric power source and respectively related to said first, second and third phase exciting coils, and first, second and third capacitors respectively interposed between said inversely connected diodes and said first, second, and third back-flow preventing diodes, said circuit means promptly discharging a magnetic energy stored in one of said exciting coils into a corresponding one of said first, second, and third capacitors, as a charged voltage, through a corresponding one of said inversely connected diodes to charge said corresponding one capacitor and to rapidly extinguish the magnetic energy stored in said one exciting coil at the moment when the respective exciting current supplied to said one exciting coil is stopped, said circuit means also steeply building up the respective exciting current supplied to a subsequently activated exciting coil by use of the charged voltage in said corresponding capacitor;

said position detecting elements being disposed in such a manner that, before any one of said salient-poles begins to enter any one of said magnetic poles, the current supply control circuit is initiated to supply the exciting current respectively corresponding to the exciting coil associated with said any one of said magnetic poles, and said position detecting device outputs one of said detecting signals sufficient for continuing the current supply to the associated exciting coil during a predetermined large electric angle; and a pair of corresponding magnetic poles of said plurality of magnetic poles being disposed to face each other in a diametric direction of said armature, and the exciting coils respectively associated with said magnetic poles being activated simultaneously by said current supply control circuit so as to have the same phase.

10. A three-phase full wave reluctance type motor driven by a DC electric power source, said high speed reluctance type motor comprising:

an outer casing having an inner surface;
a rotor having an outer surface formed with a plurality of salient poles having equal circumferential widths and equally spaced with each other in a circumferential direction, the rotor rotatably supported on the outer casing;
an armature having an inner surface being formed with 12 n (n: a positive integer) pieces of magnetic pole respectively having circumferential widths of one of a 120-and a 180-degree electric angle and equally spaced from each other in the circumferential direction to face said plurality of salient poles over slight gaps, and including first through sixth phase exciting coils respectively associated with said magnetic poles, said armature being fixed on the inner surface of the outer casing;
a position detecting device having a number of position detecting elements spaced apart from each other so as to correspond to said phase exciting coils, successively outputting a first phase position detecting signal having a rectangular waveform generating a predetermined signal level of a 120~150-degree width at regular intervals of a 360-degree electric angle, a second phase position detecting signal having the same rectangular waveform but delayed by an electric angle of 120 degrees with respect to the first phase position detecting signal, and a third phase position detecting signal having the same rectangular waveform but delayed by an electric angle of 120 degrees with respect to the second phase position detecting signal and also outputting fourth, fifth and sixth phase position detecting signals having opposite phases with respect to said first, second and third phase position detecting signals, respectively, in accordance with a rotational position of said rotor;
a current supply control circuit including a plurality of switching elements, each end of each phase exciting coil serially connected to a respective one of said plurality of switching elements, each of said plurality of switching elements interposed between the DC electric power source and a corresponding one of said first through sixth phase exciting coils, alternately activating and deactivating said first through sixth phase exciting coils by alternately turning on and off said corresponding serially connected switching elements in response to said first through sixth phase position detecting signals, to control exciting currents flowing through respective said first through sixth phase exciting coils, each switching element and corresponding serially connected exciting coil forming a joint unit;
circuit means including diodes respectively connected inversely to said joint units, first, second and third back-flow preventing diodes respectively connected in a forward direction with respect to the DC electric power source and respectively relating to said first and fourth phase exciting coils, said second and fifth phase exciting coils and said third and sixth phase exciting coils, respectively, and first, second and third capacitors respectively interposed between said first, second and third back-flow preventing diodes, said circuit means promptly discharging a magnetic energy stored in one of said exciting coils into a corresponding one of said first, second and third capacitors, as a charged voltage, through a corresponding one of said inversely connected diodes to charge said corresponding one capacitor and to rapidly extinguish the magnetic energy stored in said one exciting coil at the moment when the respective exciting current supplied to said one exciting coil is stopped, said circuit means steeply building up the respective exciting current supplied to a subsequently activated exciting coil by use of the charged voltage in said corresponding one capacitor;

said number of position detecting elements being disposed in such a manner that, before any one of said salient poles begins to enter any one of said magnetic poles, said current supply control circuit is initiated to supply the exciting current respectively corresponding to the exciting coil associated with said any one of said magnetic poles, and said position detecting device outputs one of said position detecting signals sufficient for continuing the current supply of the respective exciting current to the one exciting coil during a predetermined large electric angle;

a pair of corresponding magnetic poles of said 12 n pieces of magnetic pole being disposed facing each other in a diametric direction of said armature, and said exciting coils respectively associated with said magnetic poles being activated simultaneously by said current supply control circuit to have the same phase.

11. A two-phase full-wave reluctance type motor driven by a DC electric power source, said reluctance type motor comprising:

an outer casing having an inner surface;

a rotor having an outer surface formed with a plurality of salient poles having equal circumferential widths, equally spaced with each other in a circumferential direction, the rotor rotatably supported on the outer casing;

an armature having an inner surface formed with 8 n (n: a positive integer) pieces of magnetic pole respectively having circumferential widths of a 120-degree electric angle and equally spaced from each other in the circumferential direction to face said plurality of salient poles over slight gaps, including first through fourth phase exciting coils, respectively associated with said magnetic poles, said armature being fixed on the inner surface of the outer casing;

a position detecting device, having a number of position detecting elements spaced apart from each other so as to correspond to said exciting coils, successively outputting a first phase position detecting signal having a rectangular waveform generating a predetermined signal level of a 90~150-degree width at regular intervals of a 360-degree electric angle, a second phase position detecting signal having the same rectangular waveform but delayed by an electric angle of 90 degrees with respect to the first phase position detecting signal, and also outputting third and fourth phase position detecting signals having opposite phases with respect to said first and second phase position detecting signals, respectively, in accordance with a rotational position of said rotor;

a current supply control circuit including a plurality of switching elements, each end of each exciting coil serially connected to a respective one of said plurality of switching elements, each of said plurality of switching elements interposed between the DC electric power source and a corresponding one of said first through fourth phase exciting coils, alternately activating and deactivating said first through fourth phase exciting coils by alternately turning on and off said corresponding serially connected switching elements in response to corresponding said first through fourth phase position detecting, to control exciting currents flowing through respective said first through sixth phase exciting coils, each switching element and corresponding serially connected exciting coil forming a joint unit;

circuit means including diodes respectively connected inversely to said joint units, first and second back-flow preventing diodes respectively connected in a forward direction with respect to the DC electric power source and respectively relating to said first and third phase exciting coils and said second and fourth phase exciting coils, respectively, and first and second capacitors respectively interposed between said first and second back-flow preventing diodes, said circuit means promptly discharging a magnetic energy stored in one of said exciting coils into a corresponding one of said first and second capacitors, as a charged voltage, through a corresponding one of said inversely connected diodes to charge said corresponding one capacitor and to rapidly extinguish the magnetic energy stored in said one exciting coil at the moment when the respective exciting current supplied to said one exciting coil is stopped, said circuit means steeply building up the respective exciting current supplied to a subsequently activated exciting coil by use of the charged voltage in said corresponding one capacitor;

said number of position detecting elements being disposed in such a manner that, before any one of said salient poles begins to enter any one of said magnetic poles, said current supply control circuit is initiated to supply the exciting current respectively corresponding to the exciting coil associated with said any one of said magnetic poles, and said position detecting device outputs one of said position detecting signals sufficient for continuing the current supply of the respective exciting current to the one exciting coil during a predetermined large electric angle;

a pair of corresponding magnetic poles of said 8 n pieces of magnetic pole being disposed facing each other in a diametric direction of said armature, and said exciting coils respectively associated with said magnetic poles being activated simultaneously by said current supply control circuit to have the same phase.

12. A two-phase full-wave reluctance type motor driven by a DC electric power source, said reluctance type motor comprising:

an outer casing having an inner surface;

a rotor having an outer surface formed with a plurality of salient poles having the same circumferential widths and equally spaced with each other in a circumferential direction, the rotor rotatably supported on the outer casing;

an armature having an inner surface formed with 8 n (n: a positive integer) pieces of magnetic pole respectively having circumferential widths of a 120-degree electric angle and equally spaced from each other in the circumferential direction to face said plurality of salient poles over slight gaps, including first through fourth phase exciting coils, respectively associated with said magnetic poles, said armature being fixed on the inner surface of the outer casing;

a position detecting device, having a number of position detecting elements spaced apart from each other so as to correspond to said exciting coils, successively outputting a first phase position detecting signal having a rectangular waveform generating a predetermined signal level of a 90~150-degree width at regular intervals of a 360-degree electric angle, a second phase position detecting signal having the same rectangular waveform but delayed by an electric angle of 90 degrees with respect to the first phase position detecting signal, and also outputting third and fourth phase position detecting signals having opposite phases with respect to said first and second phase position detecting signals, respectively, in accordance with a rotational position of said rotor;

a current supply control circuit including a plurality of switching elements, each end of each exciting coil serially connected to a respective one of said plurality of switching elements, each of said plurality of switching elements interposed between the DC electric power source and a corresponding one of said first through fourth phase exciting coils, alternately activating and deactivating said first through fourth phase exciting coils by alternately turning on and off said corresponding serially connected switching elements in response to corresponding said first through fourth phase position detecting signals, to control exciting currents flowing through respective said first through sixth phase exciting coils, each switching element and corresponding serially connected exciting coil forming a joint unit;

circuit means including diodes respectively connected inversely to said joint units, first, second, third and fourth back-flow preventing diodes respectively connected in a forward direction with respect to the DC electric power source and respectively relating to said first through fourth phase exciting coils, respectively,, and first, second, third and fourth capacitors respectively interposed between said inversely connected diodes and said first, second, third and fourth back-flow preventing diodes, said circuit means promptly discharging a magnetic energy stored in one of said exciting coils into a corresponding one of said first and second capacitors, as a charged voltage, through a corresponding one of said inversely connected diodes to charge said corresponding one capacitor and to rapidly extinguish the magnetic energy stored in said one exciting coil at the moment when the respective exciting current supplied to said one exciting coil is stopped, said circuit means steeply building up the respective exciting current supplied to a subsequently activated exciting coil by use of the charged voltage in said corresponding one capacitor;

said number of position detecting elements being disposed in such a manner that, before any one of said salient poles begins to enter any one of said magnetic poles, said current supply control circuit is initiated to supply the exciting current respectively corresponding to the exciting coil associated with said any one of said magnetic poles, and said position detecting device outputs one of said position detecting signals sufficient for continuing the current supply of the respective exciting current to the one exciting coil during a predetermined large electric angle;

a pair of corresponding magnetic poles of said 8 n pieces of magnetic pole being disposed facing each other in a diametric direction of said armature, and said exciting coils respectively associated with said magnetic poles being activated simultaneously by said current supply control circuit to have the same phase.

13. A three-phase full wave reluctance type motor driven by a DC electric power source, said reluctance type motor comprising:

an outer casing having an inner surface;

a rotor having an outer surface formed with a plurality of salient poles having the same circumferential widths and equally spaced with each other in a circumferential direction, the rotor rotatably supported on the outer casing;

an armature having an inner surface formed with 12 n (n: a positive integer) pieces of magnetic pole respectively having circumferential widths of one of a 120- and a 180-degree electric angle and equally spaced from each other in the circumferential direction to face said plurality of salient poles over slight gaps, including first through sixth phase exciting coils, respectively associated with said magnetic poles, said armature being fixed on the inner surface of the outer casing;

a position detecting device, having a number of position detecting elements spaced apart from each other so as to correspond to said exciting coils, successively outputting a first phase position detecting signal having a rectangular waveform generating a predetermined signal level of a 90-degree width at regular intervals of a 360-degree electric angle, a second phase position detecting signal having the same rectangular waveform but delayed by an electric angle of 120 degrees with respect to the first phase position detecting signal, and a third phase position detecting signal having the same rectangular waveform but delayed by an electric angle of 120 degrees with respect to the second phase position detecting signal and also outputting fourth, fifth and sixth phase position detecting signals having opposite phases with respect to said first, second and third phase position detecting signals, respectively, in accordance with a rotational position of said rotor;

a current supply control circuit including a plurality of switching elements, each end of each exciting coil serially connected to a respective one of said plurality of switching elements, each of said plurality of switching elements interposed between the DC electric power source and a corresponding one of said first through sixth phase exciting coils, alternately activating and deactivating said first through sixth phase exciting coils by alternately turning on and off said corresponding serially connected switching elements in response to corresponding said first through sixth phase position detecting signals, to control exciting currents flowing through respective said first through sixth phase exciting coils, each switching element and corresponding serially connected exciting coil forming a joint unit;

circuit means including diodes respectively connected inversely to said joint units, first and second back-flow preventing diodes respectively connected in a forward direction with respect to the DC electric power source and respectively relating to said first, second and third phase exciting coils, and said fourth fifth and sixth phase exciting coils, respectively, and first and second capacitors respectively interposed between said inversely connected diodes and said and said first and second back-flow preventing diodes, said circuit means promptly discharging a magnetic energy stored in one of said exciting coils into a corresponding one of said first and second capacitors, as a charged voltage, through a corresponding one of said inversely connected diodes to charge said corresponding one capacitor and to rapidly extinguish the magnetic energy stored in said one exciting coil at the moment when the respective exciting current supplied to said one exciting coil is stopped, said circuit means steeply building up the respective exciting current supplied to a subsequently activated exciting coil by use of the charged voltage in said corresponding one capacitor;

said number of position detecting elements being disposed in such a manner that, before any one of said salient poles begins to enter any one of said magnetic poles, said current supply control circuit is initiated to supply the exciting current respectively corresponding to the exciting coil associated with said any one of said magnetic poles, and said position detecting device outputs one of said position detecting signals sufficient for continuing the current supply of the respective exciting current to the one exciting coil during a predetermined large electric angle;

a pair of corresponding magnetic poles of said 12 n pieces of magnetic pole being disposed facing each other in a diametric direction of said armature, and said exciting coils respectively associated with said magnetic poles being activated simultaneously by said current supply control circuit to have the same phase.

14. The reluctance type motor as in one of claims 9-13, further comprising:

an exciting current detecting circuit for generating detecting signals representing values of actual respective said exciting coils; and a chopper circuit maintaining each of the exciting currents at a current value corresponding to a standard voltage.

15. A reluctance type motor driven by a DC electric power source and having a motor main body including a rotor equipped with a plurality of salient-poles and an armature equipped with a plurality of magnetic poles respectively associated with a plurality of exciting coils, said reluctance type motor comprising:

a position detecting device having a number of position detecting elements spaced apart from each other and successively outputting position detecting signals in accordance with a rotational position of the rotor;

a current supply control circuit connected to the DC electric power source for successively activating said exciting coils by supplying respective exciting currents to said exciting coils in response to said position detecting signals; and said number of position detecting elements being disposed wherein said current supply control circuit is initiated to supply the respective exciting current to the one of said exciting coils associated with said any one of said magnetic poles an interval before any one of said salient-poles begins to enter any one of said magnetic poles and said position detecting device outputs one of said position detecting signals sufficient for maintaining flow of the respective exciting current to the one exciting coil during a predetermined large electric angle.

16. A reluctance type motor driven by a DC electric power source and having a motor main body including a rotor equipped with a plurality of salient-poles and an armature equipped with a plurality of magnetic poles respectively associated with a plurality of exciting coils, said reluctance type motor comprising:

a position detecting device having a number of position detecting elements spaced apart from each other, and successively outputting a first group of a plurality of position detecting signals and also outputting a second group of said plurality of position detecting signals respectively having opposite phases with respect to said first group of position detecting signals, in accordance with a rotational position of said rotor;

a current supply control circuit being connected to the DC electric power source, successively activating a first group of said plurality of exciting coils in response to said first group of position detecting signals and also successively activating a second group of said plurality of exciting coils in response to said second group of position detecting signals, by supplying respective exciting currents to said plurality of exciting coils; and, said position detecting elements being disposed in such a manner that, an interval before any one of said salient-poles begins to enter any one of said magnetic poles, the current supply control circuit is initiated to supply the exciting current respectively corresponding to the exciting coil associated with said any one of said magnetic poles, and said position detecting device outputs one of said position detecting signals sufficient for continuing the current supply to the associated exciting coil during a predetermined large electric angle.

* * * * *

UNITED STATES PATENT AND TRADEMARK OFFICE
CERTIFICATE OF CORRECTION

PATENT NO. : 5,355,069
DATED : October 11, 1994
INVENTOR(S) : Itsuki BAHN

It is certified that error appears in the above-indentified patent and that said Letters Patent is hereby corrected as shown below:

Title Page, under [57] Abstract, line 14, after "the" insert --one--.

Title Page, under [57] Abstract, line 20, after "continued" insert --to be supplied--.

Column 1, line 7, after "used" insert --as--;

line 41, after "If" insert --a--;

line 57, change ";" to --,--;

line 58, change ";" to --,--.

UNITED STATES PATENT AND TRADEMARK OFFICE
CERTIFICATE OF CORRECTION

PATENT NO. : 5,355,069
DATED : October 11, 1994
INVENTOR(S) : Itsuki BAHN

It is certified that error appears in the above-indentified patent and that said Letters Patent is hereby corrected as shown below:

Column 2, line 1, change "to causing" to

--, causing-- and change "yibrations" to

--vibrations--;

line 22, change "supressing" to

--suppressing--;

line 59, before "Moreover" insert

--NEW PARAGRAPH--.

Column 5, line 33, after "respect" insert --to--.

UNITED STATES PATENT AND TRADEMARK OFFICE
CERTIFICATE OF CORRECTION

PATENT NO. : 5,355,069
DATED : October 11, 1994
INVENTOR(S) : Itsuki BAHN

It is certified that error appears in the above-indentified patent and that said Letters Patent is hereby corrected as shown below:

Column 7, line 9, change "i.e." to --i.e.,--, and after "and" insert --20e--;

line 10, change "the" to --The--;

line 12, delete ",";

line 17, after "connected" insert --in--;

line 21, change "terminals" to --terminal--.

Column 10, line 35, change "the can" to --can the--;

lines 50-51, change "compromise" to

--comprise--.

Column 11, line 16, delete "the" (first occurrence).

line 44, change "52a" to --52a,--;

line 51, change "to adjust" to

--by adjusting--.

UNITED STATES PATENT AND TRADEMARK OFFICE
CERTIFICATE OF CORRECTION

PATENT NO. : 5,355,069
DATED : October 11, 1994
INVENTOR(S) : Itsuki BAHN

It is certified that error appears in the above-indentified patent and that said Letters Patent is hereby corrected as shown below:

Column 12, line 5, change "16" (second occurrence) to

--16--;

line 12, change "other" to --other,--.

Column 13, line 32, change "17i" to --17j--;

line 38, change "No.3phase" to

--No. 3 phase--;

line 50, change "No.1, No.2and" to

--No. 1, No. 2 and--;

line 51, change "No.3phase" to

--No. 3 phase--.

Column 14, line 60, change "deactivated" to

--deactivated,--.

UNITED STATES PATENT AND TRADEMARK OFFICE
CERTIFICATE OF CORRECTION

PATENT NO. : 5,355,069
DATED : October 11, 1994
INVENTOR(S) : Itsuki BAHN

It is certified that error appears in the above-indentified patent and that said Letters Patent is hereby corrected as shown below:

Column 15, line 30, after "control" insert --of--;

line 49, delete "can";

line 63, delete "of".

Column 16, line 54, after "so" insert

--that the exciting current can be controlled to--.

Column 17, line 52, change "40c" to --40c,--;

line 60, change "salient poles" to

--salient-poles--.

Column 19, line 12, change "10e" to --10e,--;

line 20, change "10e" to --10e,--;

line 32, after "terminals" insert

--7a~7d--.

UNITED STATES PATENT AND TRADEMARK OFFICE
CERTIFICATE OF CORRECTION

PATENT NO. : 5,355,069
DATED : October 11, 1994
INVENTOR(S) : Itsuki BAHN

It is certified that error appears in the above-indentified patent and that said Letters Patent is hereby corrected as shown below:

Column 20, line 16, delete "," (second occurrence).

Column 21, line 42, change "180degree" to
--180 degree--.

Column 28, line 2, after "detecting" insert
--signals.--.

Column 29, line 40, delete "," (third occurrence).

Column 31, line 4, change "fourth" to --fourth,--;
line 7, delete "and said" (first occurrence).

Signed and Sealed this

Twenty-fifth Day of April, 1995

Attest:

BRUCE LEHMAN .

*Attesting Officer*      *Commissioner of Patents and Trademarks*